United States Patent
Saavedra

(10) Patent No.: US 10,333,832 B2
(45) Date of Patent: Jun. 25, 2019

(54) SYSTEM, APPARATUS AND METHOD FOR PROVIDING IMPROVED PERFORMANCE OF AGGREGATED/BONDED NETWORK CONNECTIONS WITH MULTIPROTOCOL LABEL SWITCHING

(71) Applicant: TELOIP INC., Mississauga (CA)

(72) Inventor: Patricio Humberto Saavedra, Toronto (CA)

(73) Assignee: ADAPTIV NETWORKS INC., Mississauga (CA)

( * ) Notice: Subject to any disclaimer, the term of this patent is extended or adjusted under 35 U.S.C. 154(b) by 0 days.

(21) Appl. No.: 15/511,929

(22) PCT Filed: Sep. 17, 2014

(86) PCT No.: PCT/CA2014/000694
§ 371 (c)(1),
(2) Date: Mar. 16, 2017

(87) PCT Pub. No.: WO2016/041048
PCT Pub. Date: Mar. 24, 2016

(65) Prior Publication Data
US 2017/0250901 A1    Aug. 31, 2017

(51) Int. Cl.
*H04L 12/709*    (2013.01)
*H04W 76/16*    (2018.01)
(Continued)

(52) U.S. Cl.
CPC ........ *H04L 45/245* (2013.01); *G06F 9/45533* (2013.01); *H04L 5/0098* (2013.01);
(Continued)

(58) Field of Classification Search
CPC ... H04L 45/245; H04L 69/14; H04L 12/2867; H04L 5/0098; H04L 12/6418; H04L 2012/5624; H04W 76/16; G06F 9/45533
See application file for complete search history.

(56) References Cited

U.S. PATENT DOCUMENTS

| | | | |
|---|---|---|---|
| 5,617,417 | A | 4/1997 | Sathe et al. |
| 5,764,740 | A | 6/1998 | Holender |

(Continued)

FOREIGN PATENT DOCUMENTS

| | | | |
|---|---|---|---|
| CN | 1897492 | A | 1/2007 |
| EP | 0910195 | A2 | 4/1999 |

(Continued)

OTHER PUBLICATIONS

Patent Cooperation Treaty, Written Opinion and International Search Report dated Oct. 17, 2014, issued on PCT Application No. PCT/CA2014/000595.

(Continued)

*Primary Examiner* — Afshawn M Towfighi
(74) *Attorney, Agent, or Firm* — Norton Rose Fulbright Canada LLP

(57) ABSTRACT

A network system, method, and device are provided for improving network communication performance between at least a first client site and a second client site, where the first client site and the second client site are at a distance from one another that is such that would usually require long haul network communication. The network system includes at least one network bonding/aggregation computer system for bonding or aggregating one or more diverse network connections so as to configure a bonded/aggregated connection that has increased throughput; and at least one network server component, configured to interoperate with the client site network component, the network server component including a server/concentrator or a cloud concentrator (Continued)

element that is implemented at an access point to an multiple protocol label switching network.

20 Claims, 14 Drawing Sheets

(51) Int. Cl.

| | | |
|---|---|---|
| H04L 12/64 | (2006.01) | |
| G06F 9/455 | (2018.01) | |
| H04L 5/00 | (2006.01) | |
| H04L 12/28 | (2006.01) | |
| H04L 29/06 | (2006.01) | |
| H04L 12/70 | (2013.01) | |

(52) U.S. Cl.
CPC ...... *H04L 12/2867* (2013.01); *H04L 12/6418* (2013.01); *H04L 69/14* (2013.01); *H04W 76/16* (2018.02); *H04L 2012/5624* (2013.01); *Y02D 50/30* (2018.01)

(56) References Cited

U.S. PATENT DOCUMENTS

| | | | |
|---|---|---|---|
| 5,809,070 | A | 9/1998 | Krishnan et al. |
| 6,002,670 | A | 12/1999 | Rahman et al. |
| 6,262,976 | B1 | 7/2001 | McNamara |
| 6,621,859 | B1 | 9/2003 | Bell et al. |
| 6,778,495 | B1 | 8/2004 | Blair |
| 7,167,860 | B1 | 1/2007 | Black et al. |
| 7,177,284 | B2 | 2/2007 | Peleg et al. |
| 7,630,412 | B2 | 12/2009 | Wright et al. |
| 7,646,708 | B2 | 1/2010 | McGee et al. |
| 7,843,843 | B1 * | 11/2010 | Papp, III ............ H04L 41/5009 370/252 |
| 8,155,158 | B2 | 4/2012 | Saavedra |
| 2002/0114276 | A1 | 8/2002 | Basturk |
| 2004/0213386 | A1 | 10/2004 | Gupta |
| 2005/0030974 | A1 | 2/2005 | Wright et al. |
| 2006/0098573 | A1 | 5/2006 | Beer et al. |
| 2006/0176900 | A1 | 8/2006 | Liu et al. |
| 2006/0215689 | A1 | 9/2006 | Liu et al. |
| 2008/0075111 | A1 | 3/2008 | Hu et al. |
| 2008/0080371 | A1 | 4/2008 | Liu et al. |
| 2009/0182874 | A1 | 7/2009 | Morford et al. |
| 2010/0046536 | A1 | 2/2010 | Wright et al. |
| 2010/0046539 | A1 | 2/2010 | Wright et al. |
| 2010/0271951 | A1 * | 10/2010 | Dujardin ............ H04L 63/0272 370/241 |
| 2011/0013569 | A1 | 1/2011 | Scherzer et al. |
| 2011/0041002 | A1 | 2/2011 | Saavedra |
| 2011/0081955 | A1 | 4/2011 | Lange et al. |
| 2013/0064255 | A1 | 3/2013 | Saavedra |
| 2015/0003465 | A1 | 1/2015 | Saavedra |
| 2015/0350019 | A1 | 12/2015 | Terayama et al. |

FOREIGN PATENT DOCUMENTS

| | | |
|---|---|---|
| WO | 2004/043013 A1 | 5/2004 |
| WO | 2006095273 A1 | 9/2006 |
| WO | 2006100610 A1 | 9/2006 |
| WO | 2007113645 A2 | 10/2007 |
| WO | 2010/054475 A1 | 5/2010 |
| WO | 2014/135216 A1 | 9/2014 |

OTHER PUBLICATIONS

WPO, International Search Report and Written Opinion for PCT Application No. PCT/CA2017/050787 dated Oct. 2, 2017.
EPO, Extended European Search Report for EP Application No. 14832123.5 dated Apr. 20, 2017.
EPO, Office Action for EP Application 09825684.5 dated Sep. 15, 2017.
IP Australia, Office Action dated Jul. 25, 2014, issued on Australian Patent Application No. 2009316197.
Canadian Intellectual Property Office, Office Action dated Apr. 14, 2014, issued on Canadian Patent Application No. 2,743,548.
State Intellectual Property Office, Office Action dated Aug. 23, 2013, issued on Chinese Patent Application No. 200980149872.1 (english translation provided).
State Intellectual Property Office, Office Action dated Apr. 30, 2014, issued on Chinese Patent Application No. 2009801498721 (english translation provided).
European Patent Office, Extended European Search Report dated Jan. 3, 2013, issued on European Patent Application No. 09825684. 5.
United States Patent and Trademark Office, Office Action Summary dated Apr. 29, 2014, issued on U.S. Appl. No. 13/420,938.
EPO, Office Action for EP Application No. 09825684.5 dated Mar. 31, 2017.
Patent Cooperation Treaty, International Search Report and Written Opinion dated May 27, 2015 for PCT Application No. PCT/CA2014/ 000694.
IP Australia, Notice of Acceptance dated Aug. 6, 2015 issued in Australian application No. 2009316197.
IP Australia, Office Action dated Jun. 17, 2015 issued in related Australian application No. 2014295861.
United States Patent & Trademark Office, Office Action dated Jul. 2, 2015 issued in related U.S. Appl. No. 14/489,036.
United States Patent and Trademark Office, Office Action Summary dated Jul. 19, 2013, issued on U.S. Appl. No. 13/420,938.
Norton Rose Fulbright Canada LLP, Office Action Response dated Oct. 21, 2013, filed on U.S. Appl. No. 13/420,938.
Mushroom Networks, Inc.; Mushroom Networks; http://www. mushroomnetworks.com/product.aspx?product_id=1000&tab= features; p. 1-2; 2004-2008.
Internet Engineering Task Force; The PPP Multilink Protocol; http://www.ietf.org/rfc/rfc1990.txt?number=1990; Aug. 1, 1996.
United States Patent and Trademark Office, Office Action Summary dated Apr. 9, 2010, issued on U.S. Appl. No. 12/269,439.
Miller Thomson LLP, Office Action Response dated Sep. 30, 2010, filed on U.S. Appl. No. 12/269,439.
United States Patent and Trademark Office, Office Action Summary dated Dec. 7, 2010, issued on U.S. Appl. No. 12/269,439.
Miller Thomson LLP, Office Action Response dated Jun. 7, 2011, filed on U.S. Appl. No. 12/269,439.
United States Patent and Trademark Office, Office Action Summary dated Jun. 23, 2011, issued on U.S. Appl. No. 12/269,439.
Miller Thomson LLP, Office Action Response dated Nov. 10, 2011, filed on U.S. Appl. No. 12/269,439.
United States Patent and Trademark Office, Office Action Summary dated Jun. 27, 2014, issued on U.S. Appl. No. 13/420,938.
USPTO, Office Action for U.S. Appl. No. 13/958,009 dated Jul. 1, 2015.

* cited by examiner

SYSTEM, APPARATUS AND METHOD FOR PROVIDING IMPROVED PERFORMANCE OF AGGREGATED/BONDED NETWORK CONNECTIONS WITH MULTIPROTOCOL LABEL SWITCHING

CROSS REFERENCE TO RELATED APPLICATIONS

This application is a continuation-in-part of U.S. patent application Ser. No. 13/958,009 filed on Aug. 2, 2013, which is a continuation-in-part of U.S. patent application Ser. No. 13/420,938, filed on Mar. 15, 2012, which is a continuation of U.S. patent application Ser. No. 12/269,439, filed on Nov. 12, 2008, all of which are hereby incorporated by reference.

FIELD OF THE INVENTION

Embodiments described herein relate generally to network communications and, in particular, to aggregating or bonding communications links so as to improve network performance or quality of services in regards to a variety of different networks including wired and wireless networks, and including Wide Area Networks ("WAN").

BACKGROUND OF THE INVENTION

While the capacity of network connections has increased since the introduction of dial up, high speed connectivity is not ubiquitous in all regions. Also, bandwidth is not an unlimited resource and there is a need for solutions that improve the utilization bandwidth and also that address network performance issues.

Various solutions exist for improving network performance such as load balancing, bonding of links to increase throughput, as well as aggregation of links. In regards to bonding/aggregation various different technologies exist that allow two or more diverse links (which in this disclosure refers to links associated with different types of networks and/or different network carriers) are associated with one another for carrying network traffic (such as a set of packets) across such associated links to improve network performance in relation for such packets. Examples of such technologies include load balancing, WAN optimization, or ANA™ technology of TELoIP as well as WAN aggregation technologies.

Many of such technologies for improving network performance are used to increase network performance between two or more locations (for example Location A, Location B, Location N; hereinafter referred to collectively as "Locations"), where bonding/aggregation of links is provided at one or more of such locations. While the bonded/aggregated links provide significant network performance improvement over the connections available to carry network traffic for example from Location A to an access point to the backbone of a network (whether an Internet access point, or access point to another data network such as a private data network, an MPLS network, or high performance wireless network) ("network backbone"), the bonded/aggregated links are generally slower than the network backbone.

Prior art technologies including bonding/aggregation generally result in what is often referred to as "long haul" bonding/aggregation, which means that the bonded/aggregated links are maintained for example from Location A and Location B, including across the network backbone, which in many cases results in network impedance. As a result, while bonding/aggregation provides improved network performance for example from Location A to the network backbone, network performance across the entire network path for example from Location A to Location B, may be less than optimal because the technology in this case does not take full advantage of the network performance of the network backbone.

Multi-Protocol Label Switch (MPLS)

Multi-Protocol Label Switch (MPLS) is a technology framework developed by the Internet Engineering Task Force. MPLS can be a WAN virtualization using virtual routing and forwarding. It is the defacto technology used to build most carrier and enterprise networks, implemented with routers and switches. Notably, MPLS is protocol independent and can map IP addresses to MPLS labels MPLS improves network performance by forwarding packets (e.g. IP packets) from one network node to the next based on short path labels, avoiding complex lookups in a routing table. MPLS utilizes the concept of labels to direct data traffic, as a label associated with a packet generally contains the information required to direct the packet within an MPLS network. Generally speaking, a packet can enter an MPLS network through an MPLS ingress router or a provider edge/point-of-entry (PE) router, which encapsulates the packet with the appropriate labels. As the packet is transmitted along the MPLS network paths, various nodes in the network forward the packet based on the content of the labels. Sometimes a label switch router (LSR) switches or swaps the label(s) on a packet as it forwards the packet to the next node. When the packet leaves the MPLS network, an MPLS egress router or a provider edge (PE) router removes the label(s) from the packet and sends it on its way to the final destination. Typically, provider edge (PE) routers or their equivalent network elements sit on the edge of an MPLS network and act as an interface between the customer-side network and the MPLS core network. PE routers, as described above, can add or remove label(s) to incoming and exiting packets or data traffic. A single PE router may be connected to one or more customer networks. Within the MPLS core network, label switch routers (LSRs) receives incoming packets and routes or forwards the packets in accordance with their respective label information. LSRs can also swap or add label(s) to each packet.

It is also common practice for a customer who wishes to connect to an MPLS network to employ the use of customer edge (CE) routers or their equivalent network elements, which can be located on the customer premises. The CE routers can connect to one or more PE routers, which in turn connects to the MPLS core network.

MPLS can deliver a range of benefits to customers, including: convergence of voice and data networking, high performance for mission-critical and cloud applications, easy-to-manage or fully managed environments reducing operating cost, SLA based assurances, and so on. MPLS can be delivered with a variety of access technologies such as layer2, layer3, on the edge over the internet via IPSEC, and so on. In addition, MPLS itself is trending as a core networking technology with options to establish access edge points.

Routers may be any device including, without limitation, a router, switch, server, computer or any network equipment that provides routing or package forwarding capacity. Routers may or may not have routing tables. Routers may be implemented in hardware, software, or a combination of both. Routers may also be implemented as a cloud service and remotely configurable.

IPVPN/IPSEC

To improve security and confidentiality of data communicated over an MPLS network, Internet Protocol Security (IPSEC), a protocol suite for securing IP communication, may be adapted in addition to an MPLS network. With IPSEC VPN, the MPLS network is considered secured and trusted. IPSEC gateways can be any network equipment such as computers, servers, routers, or special IPSEC devices. IPSEC VPN is typically provisioned using a CE router connected to a broadband internet circuit. Alternatively, IPSEC may be implemented at the PE routers or device. AN MPLS network with IPSEC features is also sometimes also referred to as an IPSEC VPN or IPVPN network.

For example, IPSEC VPN can access into MPLS networks on the edge, which is a traditional low cost approach for branch connectivity. However, while typical IPSEC VPN can offer low price tag and reach, it lacks traffic prioritization/CoS capabilities and is hindered by poor provider Service Level Agreement (SLA) and/or Mean Time to Repair (MTTR). IPSEC VPN for MPLS Edge has not been innovated; there is a need to evolve this type of MPLS access, disrupt the market and create end-customer demand.

Generally speaking, the MPLS market in North America is growing quickly, however, price of MPLS is suffering from commoditization of private networks and from customer demand for lower prices. Despite such constraints, purchasing MPLS network can be as much as 30% more expensive compared to getting typical broadband network. Many customers are seeking an IPVPN solution with a lower price tag and increased bandwidth. For example, many MPLS customers seek an IPVPN backup solution on top of their primary network. These customers may also desire alternative network providers, technologies and implementations (e.g. 4G, other broadband solutions). Today IPVPN is typically purchased for cost and reach. However, IPVPN has numerous drawbacks such as the lack of traffic prioritization and CoS capabilities. IPVPN can also be hindered by poor provider service-level agreement (SLA) and mean time to repair (MTTR) on a given service or provider. There is thus a need for an innovative network solution that provides better network performance and quality of service.

Link Aggregation with MPLS

For customers who want to have an end-to-end VPN or MPLS network, at least one issue with MPLS networks is that they do not typically extend to the actual customer or client sites as the PE or ingress routers defining the "edge" of the MPLS network core are typically situated at network providers' premises. In order to maintain the high level of performance provided by an MPLS (with or without IPSEC) network, a good solution is required to connect the client site to the MPLS network at the PE routers. To date, some form of link aggregation technology has been occasionally adapted to fill the gap between the MPLS PE routers and the actual client site(s). However, in the current state of the art, most link aggregation technologies cannot connect to dissimilar or diverse carriers or connections. In addition, an MPLS network is typically sold as a private product or service and thus cannot offer diverse carriers or network providers, but rather require physical local loop to the end customer using the same carrier or network provider. Therefore, there exists a demand for a new system and method to allow for the utilization of diverse carriers and diverse connections via high-quality link aggregation in combination with a secured and trusted MPLS network.

There is a need for a system and method that addresses at least some of these problems, or at least alternatives.

In a market research, it has been discovered that the key drivers for corporations to choose a network architecture solution can be:

Demand for low-cost IP network services to converge business applications

Support for multiple access technologies

Cost competitiveness against MPLS and IPVPN

Support for traffic prioritization

It is also shown that the most important reasons for deploying a network architecture solution can be:

Improved operational efficiency/lower OPEX

Improved service scalability (quick & simplified service deployment)

Link major company sites/facilities

Consolidate converged applications (voice, data, Internet, video)

Focus on core business while provider manages the routing

Reduce IT/Telecom staff

It is further shown that the most important criteria for selecting WAN network architecture solution and services can be:

Security

Price and pricing structure complexity

Service reliability/QoS

Adequate guaranteed bandwidth

Service availability at key sites (geographic reach)

Performance/SLA guarantees

Operation/OPEX costs

Interoperability with existing network and access services

Self-service portals and customer support/customer care

Flexibility/scalability (quick service provisioning/bandwidth changes)

CAPEX/equipment costs (including ability to leverage existing CPE)

Embodiments of the invention disclosed in this application can deliver one or more of the benefits described above, with the utilization of diverse carriers and diverse connections via high-quality link aggregation in combination with a secured and trusted MPLS network.

SUMMARY OF THE INVENTION

In one embodiment of the invention, a network system is provided for improving network communication performance between at least a first client site and a second client site, where the first client site and the second client site can be at a distance from one another that is such that would usually require long haul network communication, the network system comprising:

(a) at least one network bonding/aggregation computer system that includes:

(i) at least one client site network component that is implemented at least at the first client site, the client site network component bonding or aggregating one or more diverse network connections so as to configure a bonded/aggregated connection that has increased throughput; and (ii) at least one network server component, configured to interoperate with the client site network component, the network server component including a server/concentrator or a cloud concentrator element that is implemented at an access point to a multiple protocol label switching network;

wherein the client site network component and the network server component can be configured to interoperate so as to provide network communications between the at least first client site and the access point, wherein between the client site network component and the network server component data traffic is carried over the bonded/aggregated connection and between the access point and the second client site the network server component automatically terminates the bonded/aggregated connection and passes the data traffic to the multiple protocol label switching network, while maintaining management of data traffic so as to provide a managed network path that incorporates at least the bonded/aggregated connection and at least one network path carried over the multiple protocol label switching network.

In another aspect, the first client site and the second client site can be at a distance from one another such that data traffic over a bonded/aggregated connection between the first client site and the second client site is subject to long haul effects.

In yet another aspect, the managed network path can be maintained between at least the first client site and the second client site without routing of network communications through a central server that increases long haul effects.

In still another aspect, one or more client site network components and one or more associated network server components may include peer-to-peer programming and based on such peer-to-peer programming operate on a peer to peer basis.

In one aspect, the network server component may be disposed at a distance from an access point that does not result in long haul effects between the network server component and the access point.

In another aspect, a plurality of network server components may be implemented in a geographic area so as to provide a Point-of-Presence (PoP), which may be made available to proximate client site network components.

In yet another aspect, two or more Points-of-Presence may be accessible to the at least one client site network component, and the client site network component:
(a) collects network performance information; and
(b) initiates the configuration of the network overlay to include one or more network server components so as to improve network communication performance.

In still another aspect, each network server component may be accessible to a plurality of client site network components, each client site network component being associated with a client site.

In another aspect, the network system may include a network of Points-of-Presence, distributed geographically so as to serve a plurality of client locations each associated with at least one client site network component.

In one aspect, the network system may include:
(a) a client site network component at each of the first client site, and at the second client site;
(b) a network server component proximal to each of the first client site and proximal to the second client site; wherein:
communications between the first client site's client site network component and associated network server component are bonded or aggregated, then terminated by the network server component associated with the first client site's client site network component, and passed to the multiple protocol label switching network;

data traffic is received by the network server component associated with the second client site and transferred on a bonded or aggregated connection between the network server component associated with the second client site and the client site network component associated with the second client site.

In another aspect, the bonding/aggregation computer system may include a network aggregation device that: (A) configures a plurality of dissimilar network connections or network connections provided by a plurality of diverse network carriers ("diverse network connections") as one or more aggregated groups, each aggregated group creating an aggregated network connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances so as to configure and maintain the aggregated network connection so that the logical connection has a total communication traffic throughput that is a sum of available communication traffic throughputs of the aggregated group of diverse network connections.

In yet another aspect, a computer implemented method for improving network communication performance between at least two sites may be provided, where the two sites are at a distance from one another that is such that would usually require long haul network communication, the method may include the steps of:
(a) using a client site network component associated with a first client site to connect to a proximal network server component, the network server component being connected to an access point to a high performing network, forming thereby a network overlay that provides a bonded or aggregated connections for carrying data packets;
(b) the network server component terminating the bonded or aggregated connection; and
(c) the network server component transferring the data packets to the high performing network, for delivery to a second client site, while maintaining management of data traffic so as to provide a managed network path that incorporates at least the bonded/aggregated connection and at least one network path carried over the high performing network, thereby reducing long haul effects.

In another aspect, the method may include receiving the data traffic at the second client site.

In yet another aspect, the method may include maintaining management of data traffic so as to provide a managed network path that includes the bonded or aggregated connection and one or more network paths of the high performing network.

In one aspect, the method may include the data traffic at a network server component associated with the second client site, the network server component initiating a bonded or aggregated connection to a client site network component associated with the second client site.

In another aspect, a plurality of network server components may form a Point-of-Presence, and the client site network component selects one or more of the network server components of the Point-of-Presence for establishing a network overlay so as to improve network performance.

In another aspect, the at least one network server component may be further configured to prepare data traffic for transmission into the multiple protocol label switching (MPLS) network.

In yet another aspect, the preparing of data traffic may include encapsulating data traffic with MPLS label(s).

In still another aspect, the at least one network server component may be further configured to prepare data traffic for transmission to the at least one client site network component.

In yet another aspect, the preparing of data traffic may include removing MPLS label(s).

In one aspect, a network system is provided for improving network communication performance between at least a first client site and a second client site, where the first client site and the second client site are at a distance from one another that is such that would usually require long haul network communication, comprising: at least one network bonding/aggregation computer system that includes: at least one client site network component that is implemented at least at a first client site, the client site network component bonding or aggregating one or more diverse network connections so as to configure a bonded/aggregated connection that has increased throughput; and at least one network server component, configured to interoperate with the client site network component, the network server component including a server/concentrator that is implemented at an access point to an multiple protocol label switching network; wherein the client site network component and the network server component are configured to interoperate so as to provide network communications between the at least first client site and the access point, wherein between the client site network component and the network server component data traffic is carried over the bonded/aggregated connection and between the access point and the second client site the network server component automatically terminates the bonded/aggregated connection and passes the data traffic to the multiple protocol label switching network, while maintaining management of data traffic so as to provide a managed network path that incorporates both at least the bonded/aggregated connection and at least one network path carried over the multiple protocol label switching network.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Examples of embodiments of the invention will now be described in greater detail with reference to the accompanying drawings, in which:

FIG. 1a illustrates the problem of long haul aggregation/bonding.

DETAILED DESCRIPTION

Figure 1A:
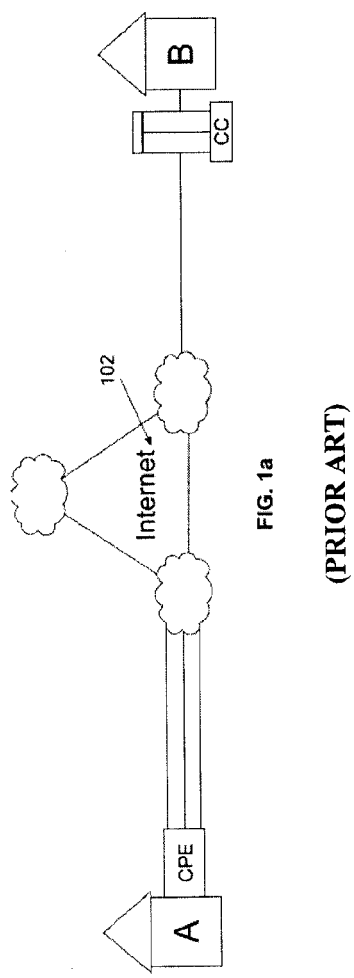
FIG. 1a illustrates a prior art network configuration that includes a bonded/aggregated network connection.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

MPLS Edge

MPLS Edge is an improved alternative to IPSEC VPN on the MPLS network. In one aspect, Autonomous Network Aggregation (ANA) or a network bonding/aggregation technology can be used as part of a hybrid solution to extend an MPLS network, allowing partners to use lower-cost broadband connectivity while maintaining the quality and reliability of an MPLS service. In another aspect, MPLS Edge virtualizes MPLS over network bonding/aggregation on the edge of carrier infrastructures, delivering MPLS labels to the customer premises equipment or device coupled with network bonding/aggregation. For example, cloud concentrators in ANA or a link aggregation system may act as an MPLS PE (Provider Edge) router on the edge of the network.

Most existing prior art link aggregation technologies cannot connect to dissimilar or diverse network carriers or connections. In addition, MPLS network is typically sold as a private product or service and thus cannot offer diverse carriers or network providers, but rather require physical local loop to the end customer using the same carrier or network provider. Using the network bonding/aggregation technology with MPLS network as described herein allows for the utilization of diverse carriers and diverse connections via high-quality link aggregation in combination with a secured and trusted MPLS network.

MPLS Edge technology can fully extend MPLS to the customer's LAN as a private service offering that can deliver consolidated WAN, VoIP, and Internet access.

In one aspect of the present invention, a system and network architecture is provided for aggregating multiple network access connections from similar or diverse carriers to create a new aggregated connection that accommodates greater speed and high availability characteristics, and that connects to an MPLS network via customer premises equipment (CPE-CE) or cloud concentrator/provider equipment (CCPE).

In another aspect of the present invention, a network solution is provided for improving network communication performance between at least two sites, where the two sites are at a distance from one another that is such that would usually require long haul network communication. The network solutions includes at least one network bonding/aggregation system that includes (A) at least one first network component that is implemented at a first service site, the first network component being configured to bond or aggregate one or more diverse network connections so as to configure a bonded/aggregated connection that has increased throughput; and (B) a second network component, configured to interoperate with the first network component, the second network component including a server/concentrator (also referred to as network server component) that is implemented at an access or point-of-entry point to a multiple protocol label switching network. Multiprotocol label switching (MPLS) is a network mechanism that directs data between network using path labels rather than network addresses, avoiding complex routing table lookups. The labels identify virtual links or paths between nodes rather than endpoints. MPLS can encapsulate packets of various network protocols and supports a range of access technologies.

In one aspect, the first network component may be implemented using what is called in this disclosure a "CPE-CE" or customer premises equipment (also referred to as customer edge (CE) router or client site network component). The CPE-CE and a server/concentrator (also known as a Cloud Concentrator Provider Equipment CCPE) component (more fully described below) interoperate to configure the bonded/aggregated connections in order to provide improve network connections at a site associated with the CPE-CE.

In one aspect of the present invention, the server/concentrator is implemented at an access or point-of-entry point to an MPLS network, with access to the network backbone provided by an MPLS networking solution so as to provide high-quality, end-to-end, secured network connection. The server/concentrator may provide a bridge between the bonded/aggregated network and the MPLS broadband network portion to deliver MPLS to the CPE. The server/concentrator may be configured to operate as a provider edge or point-of-entry (PE) router on the MPLS network. As will be described below, MPLS is protocol independent and supports a bonded/aggregated network supported protocol.

In addition, the server/concentrator may be implemented as a cloud service, a cluster service or simply a cluster hosted in cloud, or a router server configured based on certain configurations. It may also be referred to as a cluster or a cloud concentrator throughout this application. The clusters or cloud concentrators may serve multiple CPE-CEs. A client site may have multiple CPE-CEs and a cluster can serve multiple client sites. The clusters or cloud concentrators may also communicate with one another on a basis of multiple points-of-presence ("Multi-POP"), as will be described below.

In another embodiment of the invention (not illustrated), the server/concentrator (or network server component) may be remotely or closely coupled with one or more CPE-CEs, and comprise entirely of software, or entirely of hardware, or include both software and hardware components. The server/concentrator may be implemented to one or more server computers, or may be implemented as an interconnected network of computer residing at the same or different physical locations, and connected to one or more CPE-CEs and the core network (e.g. MPLS) through one or more trusted network connections. The server/concentrator can interoperate with CPE-CEs and/or the other components in the network architecture in order to deliver the functionalities described herein.

Network architectures that involve long-haul bonded/aggregated network communication result in less than optimal performance, thereby minimizing the advantages of the bonding/aggregation technology. In other words, while the bonding/aggregation technology may improve service to Site A associated with for example a CPE (or equivalent to customer premises equipment), based on bonding/aggregation between the CPE and an associated server/concentrator (or equivalent such as a cloud concentrator), overall performance may be less than desired and in fact may be less than what would be available without bonding/aggregation because of the long haul effects of carrying the bonded/aggregated from Site A, to at least Site B. These long haul effects will present wherever Site A and at least Site B are at a substantial distance from one another. The Example in Operation described below illustrates the decrease in performance that results from the long haul effects. In one exemplary embodiment of the invention, the CCPE may be implemented with virtualization software such as vmWare, vSphere5, Citrix Xen, and so on.

Referring now to FIG. 1a, which illustrates the problem of long haul aggregation/bonding generally in prior art. In the prior art bonded/aggregated network communication shown in FIG. 1a, packets are carried over the Internet through an extension of the bonded/aggregated connection across the Internet (102), rather than a high performing Internet core network such as an MPLS core network. The bonded/aggregated connection, across a distance that is subject to long haul effects, will not perform as well as the Internet, thereby providing less than ideal performance.

Figure 1B:
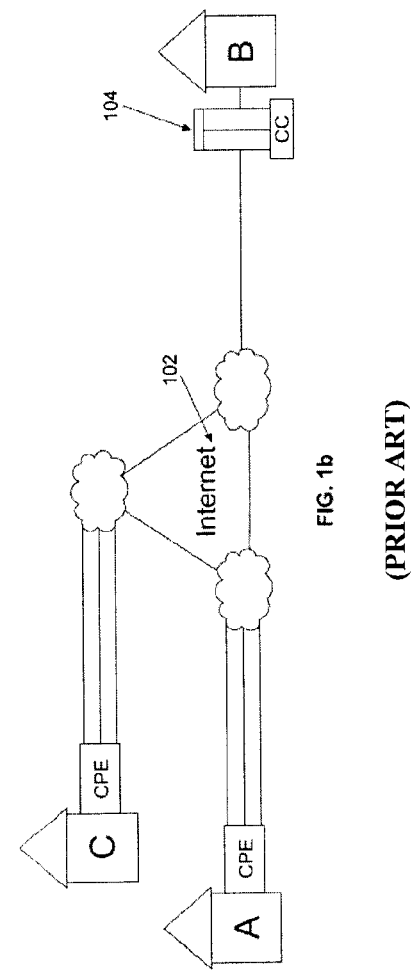
FIG. 1b also illustrates a prior art network configuration that includes central management of bonded/aggregated network connections, which also shows the problem of long-haul aggregation/bonding with multiple customer sites.

Another problem with prior art bonding/aggregation solutions is that they generally require control or management by a central server. Depending on the location of the central server, this can result in multiplying of the long haul effects because traffic between a Site A and Site B may need to also be transferred to a Site C that is associated with the central server. This aspect of the prior art technology is illustrated for example in FIG. 1b. Central server (104) manages network communications, and in fact routes network communications between Site A and Site C. To the extent that the distance between central server (104) is substantial from either of Site A or Site C, long haul effects will present. If central server (104) is at a substantial distance from each of Site A and Site C, then there will be a multiplying of the long haul effects, as network traffic will pass from Site A to the central server (104) to Site C, and from Site C to the central server (104) to Site A.

As illustrated in the Example in Operation described below, long haul effects have a negative impact on speed (slowing traffic) and also on latency. Conversely, embodiments of the present invention may provide significant improvements in regards to both speed and latency.

Embodiments of the present invention provides a novel and innovative network solution, including a network system and architecture and associated networking method, that addresses the aforesaid long haul effects that have a negative effect on performance.

Figure 1C:
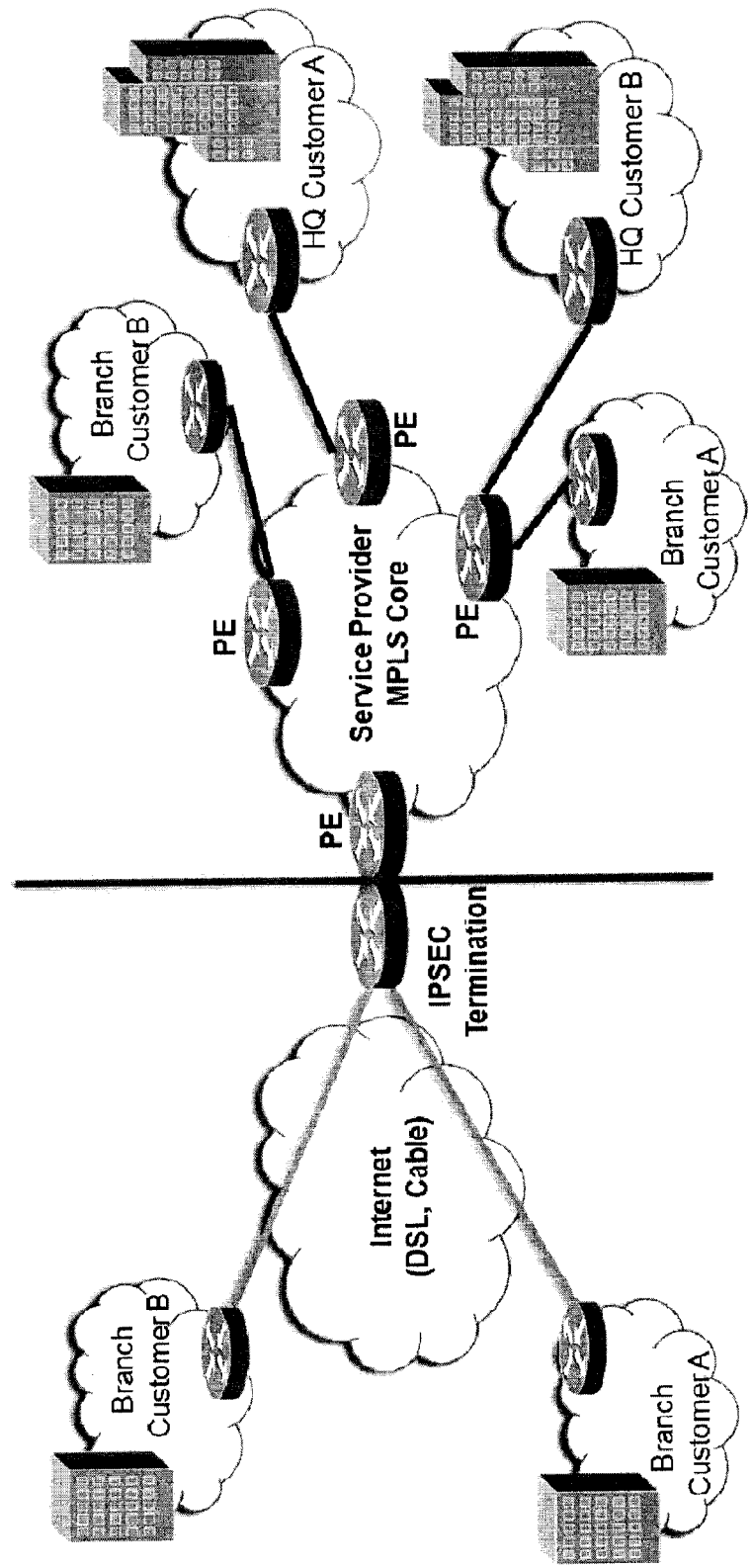
FIG. 1c illustrates a prior art MPLS network configuration with IPSEC embedded.

FIG. 1c illustrates a prior art MPLS network configuration with IPSEC embedded therein. In the prior art MPLS network shown in FIG. 1c, packets are carried over the Internet through a single connection such as DSL or cable, from Branch Customers A or B (e.g. Sites A or B) to one PE router of MPLS. An IPSEC tunnel may be implemented between the Branch Customers A or B to the MPLS PE router, and terminated immediately before or at the PE router. The PE router therefore fulfills two tasks: IPSEC remote access termination and providing an MPLS PE router. IPSEC in this prior art configuration serves mainly as a secure access method into the MPLS network. The protection of IPSEC secures the data on transport over any untrusted infrastructure, such as public WIFI hot spots or DSL Internet.

As can be seen from FIG. 1c, the network path from Branch Customer A or B to IPSEC Termination may be over a sole connection that can be, for example, a cable or a DSL connection. If the cable connection from Branch Customer A fails for any reason, then that customer would not be able to connect to the MPLS network as there is no alternative Internet connection available. In contrast, embodiments of the present invention provide significant improvements in regards to a number of additional features such as bi-directional communication, failover protection and diversity of carriers.

Though not illustrated here, it is understood that IPSEC tunnel may also be implemented from one PE router to another PE router over the MPLS network core, or from Branch Customer A to HQ Customer B (CPE-CE to CPE-CE). Regardless of the particular configuration of IPSEC over MPLS, MPLS networks with embedded IPSEC are very costly to set up, difficult to maintain and reconfigure, and generally leave much to be desired in terms of carrier diversity, failover protection, aggregated bandwidth, bi-directional communication, quality of service (QoS), prevention of dropped calls, application acceleration, and scoring of quality of experience (QoE), to name a few.

Figure 2A:
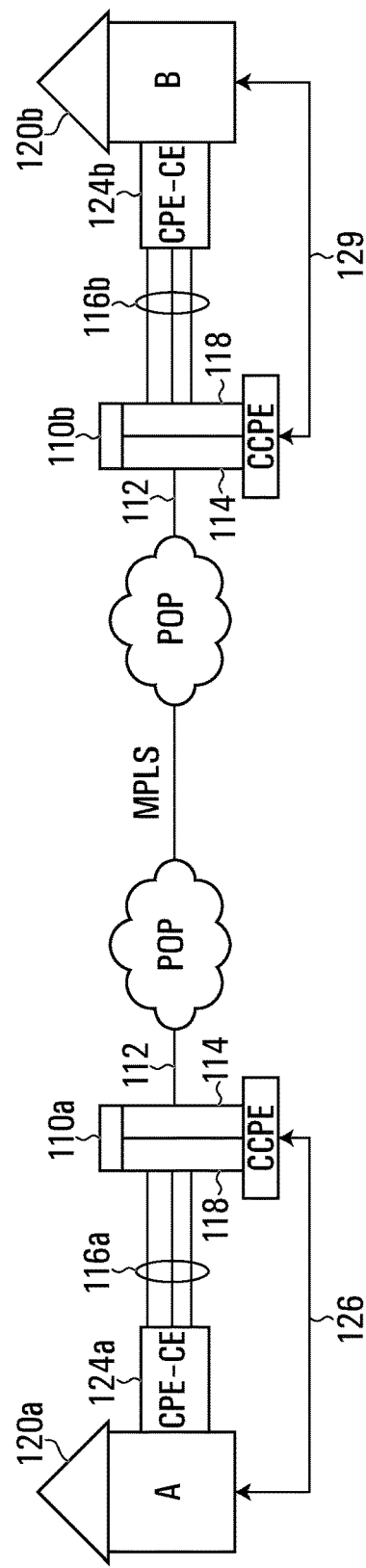
FIG. 2a shows a network solution in accordance with an embodiment of the present invention, with bonding/aggregation implemented at both Site A and Site B, while minimizing long haul effects based on the technology of the present invention.

As shown in FIG. 2a, in one aspect of the invention, the server/concentrator (or otherwise known as cloud concentrator) side of a bonding/aggregation network solution for Site A (120a) is implemented such that (A) the location of the cloud concentrator is implemented with access to the network core of MPLS (112), and (B) the cloud concentrator (110a) includes functionality for (i) receiving packets by means of the bonded/aggregated connection (116a), (ii) interrupting the bonded/aggregated connection (116a) using an interrupter (118), and (iii) directing the packets (114) to the MPLS (112) for delivery to a Site B (120b). In the case of (iii) directing the packets (114) to the MPLS (112), the cloud concentrator (110a) is also acting as the PE router of MPLS (112). The cloud concentrator (or the server/concentrator) (110a) thus is also known as the cloud concentrator provider edge or the cloud concentrator point-of-entry (CCPE) of the MPLS. If Site B also has bonded/aggregated network service, then the packets are delivered to a Site B side cloud concentrator or COPE (110b). The COPE (110b) can then establish a further bonded/aggregated connection (116b) and directs the packets (114) via the bonded/aggregated connection (116b) to a CPE-CE (B) (124b) at Site B.

Figure 2B:
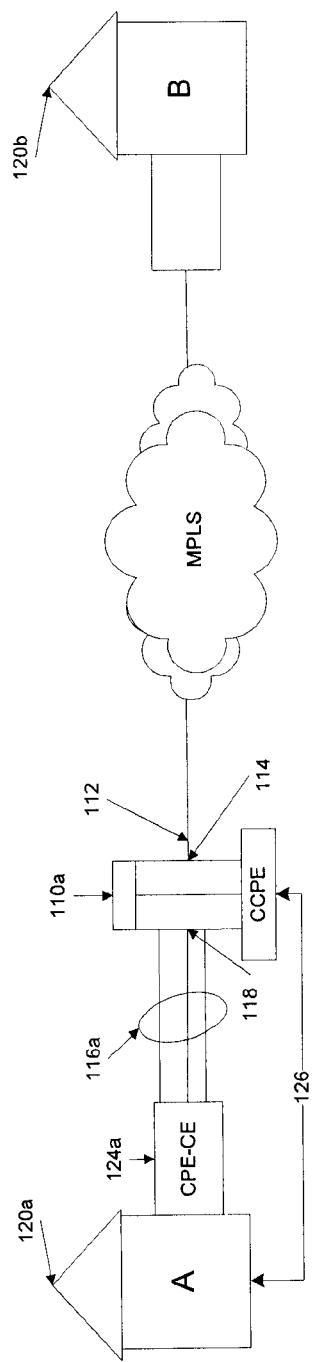
FIG. 2b shows another network solution in accordance with an embodiment of the present invention, in which bonded/aggregated network service exists at Site A but not at Site B.

FIG. 2b illustrates a configuration where bonded/aggregated network service exists at Site A but not at Site B.

Figure 2C:
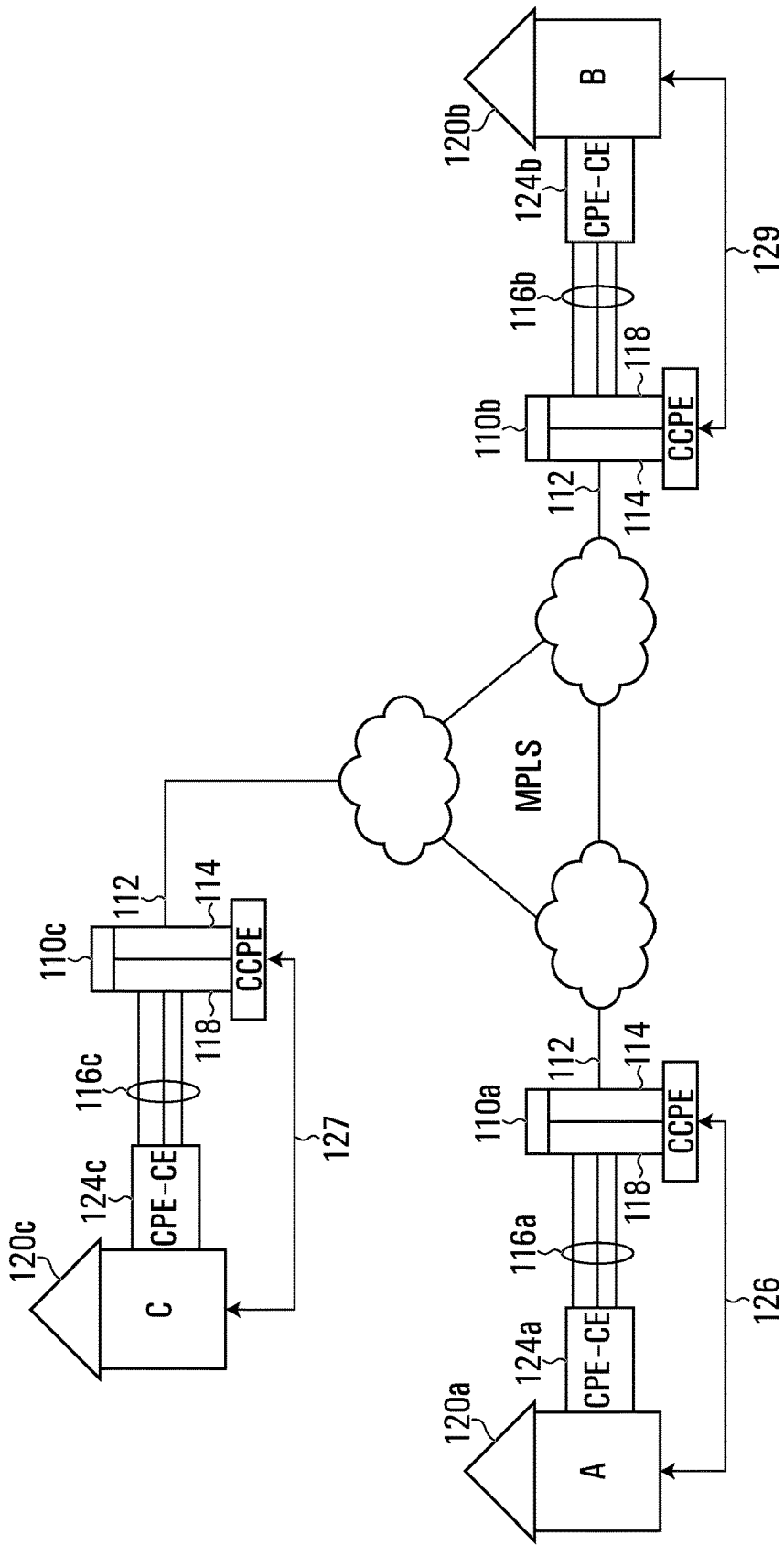
FIG. 2c shows a still other network solution in accordance with an embodiment of the present invention, in which bonding/aggregation is implemented as between Site A, Site B, and Site C.

More than two sites are possible, where the network system of an embodiment of the present invention improves network performance for network communications between for example Site A, Site B, and Site C where one or more sites will include bonded/aggregated service. In one implementation of the invention, as shown in FIG. 2c, bonded/aggregated service is present for each of Site A, Site B and Site C. FIG. 2c illustrates one possible implementation of the invention, where the network system is based on a distributed network architecture where CCPEs (110a) (110b) (110c) and corresponding CPE-CEs (124a) (124b) (124c) are configured to provide improved network communications, including interruption of network communications at the network backbone so as to reduce long haul effects, dynamically and on a peer to peer basis without the need for a persistent central manager. In one implementation, each of the network components of the network system included functionality to operate on a peer-to-peer basis.

A CPE-CE (124) initiates network communications on a bonded/aggregated basis, cooperating with a CCPE (110), with packets destined for a remote location. Each COPE (110) receives dynamic updates including a location and identifier associated with other COPE (110). Packets are dynamically sent to a COPE (110) at the remote location, if available, and from the CCPE (110) at the remote location to its CPE-CE (124). The CPE-CEs (124) and their CCPEs (110) use bi-directional control of network communications to establish a network overlay to provide improved network performance. The network overlay for example provides desirable quality of service despite underlying network conditions that may otherwise resulted in a decrease in network performance.

In accordance with the present invention, the network system of the present invention establishes and manages two or more network overlays. Referring for example to FIG. 2a a first network overlay (126) is established between the CPE-CE(A) (124a) and COPE (110a); then, communications are transferred over the MPLS (112) without a network overlay; then, a second network overlay (129) is established between COPE (110b) and CPE-CE(B) (124b). As a result, IP transport is provided between Site A and Site B where this will provide better performance than the aggregated/bonded network connections. Bonding/aggregation in effect is distributed across the locations, rather than attempting to span the distance between the locations with end to end bonding/aggregation.

Embodiments of the present invention therefore provide distributed bonding/aggregation. Embodiments of the present invention also provide a network system that automatically provides distributed bonding/aggregation in a way that bonding/aggregation is proximal, and beyond proximal connections IP transport is used, with proximal bonded/aggregated connections and fast Internet being used as part of end-to-end improved service.

In addition, system elements enabling the monitoring and maintenance of Quality of Experience (QoE) and Quality of Services (QoS) may be optionally included in the COPE and/or CPE-CE configuration as part of the present invention. In another example, the QoE and QoS elements may be implemented as part of the underlying link aggregation technology.

Embodiments of the present invention may offer advantages over the prior art technologies, including, for example:
1. Suited for voice and data transmission:
SLA Supported with Quality of Experience (QoE)
Bi-Directional QoS
OTT QoS Maintains CoS
No Dropped Calls on Link Failover
2. Carrier diversity, including network aggregation and failover protection
3. Failover: no disconnections on failover scenarios
4. Aggregated bandwidth: more reach options and scale
5. Bi-directional communication
6. Network quality of service (QoS)
7. Application acceleration
8. Quality of Experience Combining MPLS network with the link aggregation/bonding technology in accordance with exemplary embodiments may satisfy end customer needs on the MPLS network, including, for example:
Use of multiple low cost broadband circuits (for greater uptime and resiliency).
Support of prioritization and CoS for priority traffic.
Hybrid MPLS or backup network strategy without having to abandon MPLS features.
The cloud concentrator would bridge the MPLS portion of a customer's network to the broadband portion using network aggregation delivering MPLS to the CPE device (MPLS added to link aggregation technology as a supported Protocol).

Figure 2D:
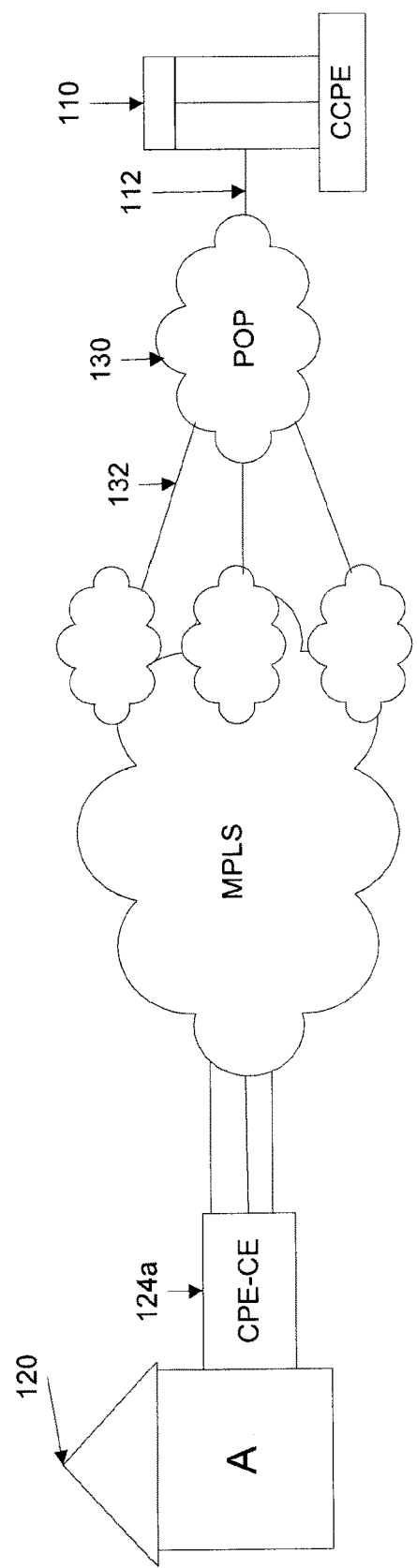
FIG. 2d shows a further implementation of the network architecture of an embodiment of the present invention, in which a plurality of servers/concentrators are implemented as part of a Point-of-Presence.

In another aspect of the invention, and as shown in FIG. 2d, one or more CCPEs can be implemented at a given physical location, as part of a Point-of Presence (PoP) (130). In one aspect of the present invention, a PoP (130) can define a relatively high concentration of servers, concentrators, and/or CCPEs within an area. In another aspect, a plurality of PoPs (130) may be available in a given geographic location. A plurality of PoPs (130) may be established based on network topology or service requirements in a given area.

In one aspect, each PoP (130) may have one or more network backbone connections (132), because in some locations different network backbones, such as a wireless Internet, a private data network, or the MPLS network, may be available. The PoP (130) may be implemented so that it dynamically interoperates with surrounding networks. The PoP (130) is a collection of network components, established at the periphery of the network backbone (112), associated with a plurality of networks, and cumulatively providing network communication service to one or more clients in a defined geographic area. In one possible implementation, the server/concentrators or CCPEs (110) located within the PoP (130) functions as a network access server for connecting to the Internet or the MPLS (112). The network access server (110) acts as the access point to the Internet (112) for a plurality of CPE devices (124) that are connected to the PoP (130). The servers/concentrators or CCPEs (110) may be configured to communicate with one another to share information regarding network conditions. Servers/concentrators and CCPEs (110) provide connectivity to CPEs and CPE-CEs (124) and may also run a networking protocol such as BGP to route servers and other network backbone connections (112).

In one aspect, servers/concentrators and CCPEs (110) are configured to detect changes in their network environment.

The CPE-CE (124) may be configured to collect information from network components in its vicinity including from one or more available PoPs (130) and their CCPEs (110). The CPE-CE (124) for example connects to a closest available CCPE (124), implemented as part of a PoP (130), and thereby having access to a connection to the MPLS network core (112). Whether the connection to the MPLS network core (112) is direct or indirect, the network connections are established so as to minimize long haul effects.

In one implementation, each CPE-CE (124) establishes a connection by dynamically advertising its IP address, and receiving replies from associated CCPE (110) along with their current network performance information. The CPE-CE (124) initiates a bonded/aggregated connection with a COPE (110) that is proximal (to minimize long haul effects between the CPE-CE (124) to the MPLS network core (112)), and also performing well based on network conditions relevant to the particular COPE.

In one implementation, a network device is deployed that bonds or aggregates multiple, diverse links. The network device may be WAN aggregator or a link aggregator.

Once the network overlay is established, various other network optimization and quality of services ("QoS") techniques may be applied.

One or more CPE-CEs and one or more CCPEs can create various different network configurations that may improve network performance in relation to network communications therebetween. In one embodiment of the invention, the CPE-CEs and CCPEs are designed to be self-configuring and self-healing, and to interoperate with one another to manage traffic in a more effective way.

"Proximal" means a distance such that based on relevant network conditions, long haul network communication and associated effects are avoided. The distance between the CPE-CE and the COPE may be proximal.

In order to take advantage of the network architecture of the present invention, the COPE (110) can be located at an access point to the MPLS network core (112) or in some other way to minimize the long haul effect, for example, by the COPE being located proximal to an access point so as to further avoid long haul network communication.

In another aspect, the bonded/aggregated connection at Site A and the bonded/aggregated connection at Site B may be different. In particular, each may include different types of network connections and that may be associated with different carriers. In one aspect of the invention, the network overlay provided operates notwithstanding such diversity.

Typically, the more sites that have the CPE-CEs/CCPEs associated with them the better network performance between them. Representative performance details are included below.

The network backbone (112) could be any high performance network including for example a private WAN, the Internet, or an MPLS network.

Network Overlay

In one aspect of the invention, one or more network overlays are established in accordance with the present invention, thereby in one aspect providing a multi-POP network that exploits multiple points of presence so as to provide a persistent, configurable/reconfigurable network configuration that provides substantial network performance improvements over prior art methods. In one aspect of the invention, the CPE-CEs/CCPEs may monitor network performance, including in the areas proximate to their position, and may reconfigure the network overlay dynamically, across multiple locations (including multiple PoPs) based on changes in MPLS network performance while providing continuity of service.

In one aspect, the network components of the present invention are intelligent, and iteratively collect network performance information. Significantly, in one aspect each CPE-CE is able to direct associated concentrator(s)/CCPE and any CPE-CE to in aggregate reconfigure the network overlay.

Significantly, in the network overlay created by the present invention management of the network may be centralized or decentralized, depending on the configuration that provides the best overall performance. This is in contrast to prior art solutions that generally require central management for example of termination of connection which results in traffic being carrier over bonded/aggregated connection that involve long haul transmission that fail to take advantage of network paths that may provide inherently better performance than the bonded/aggregated connection paths.

In one aspect, decentralized managed is made possible by peer-to-peer functionality implemented to the network components of the present invention.

In another aspect of the invention, a plurality of CCPEs may be established in multiple locations covering a plurality of different access points. Each CCPE may be used for multiple clients associated with different CPE-CEs to improve network performance for such multiple clients by providing termination of their bonded/aggregated connection, routing of communications, and encapsulation of packets to the MPLS network core. The network solution of the present invention therefore may include multiple Points-of-Presence, distributed geographically including for example in areas requiring network service, and through the network architecture of the present invention bridging geographically disparate areas with improved network communication therebetween.

Additional Implementation Detail

As previously stated, the present invention may be implemented in connection with any technology for bonding or aggregating links, and thereby reduce long haul effects. The present invention may also be implemented with any kind of MPLS network, thereby providing a high-performance, secure, end-to-end network connection between various client or customer sites.

In one aspect of the invention, the system, method and network architecture may be implemented such that the aggregated/bonded network connections described are implemented using the link aggregation technology described in U.S. Pat. No. 8,155,158. In another aspect of the invention, the system, method and network architecture may be implemented using one or more Points-of-Presences as described in patent application Ser. No. 13/958,009. What follows is additional detail regarding link aggregation/bonding in combination with an MPLS network, emphasizing the creation and management of the bonded/aggregated connections between them, and the encapsulation at CCPEs, which in the network configuration of the present invention form a part of the overall network overlay that incorporates the one or more portions that are carried over the network backbone.

Diverse network connections may be aggregated into a virtual (logical) connections that provide higher throughput as well as independence of the network characteristics of the constituent (physical) network. Aggregation may be performed at a given CPE-CE.

For instance, in one example of the implementation of the present invention, a Metro Ethernet 10 Mbps (E10) link and a T1 (DS1) link are aggregated in accordance with the invention described herein, in order to provide higher fault tolerance and improved access speeds. The aggregation of diverse carriers in accordance may extend to any broadband network connection including Digital Subscriber Line (DSL) communications links, Data over Cable Service Interface Specification (DOCSIS), Integrated Services Digital Network, Multi protocol Label Switching, Asynchronous Transfer Mode (ATM), and Ethernet, etc. The network connections may also include a WAN.

According to one aspect of the invention, an apparatus is provided for managing transfer of communication traffic over diverse network connections aggregated into a single autonomous connection, independent of the various underlying network connections. The apparatus may include a network aggregation device and an aggregation engine. The network aggregation device may be adapted to configure a plurality of network connections, and transfer communication traffic between a further network connection and the plurality of network connections, as an aggregated group for providing a transfer rate on the further communication link, and to allocate to the aggregate group a rate of transfer equal to the total available transfer rate of the underlying networks. The aggregation engine may be adapted to manage the distribution of communication traffic received both to and from a plurality of network connections, establishing newly formed aggregated network connections. The aggregation engine may be implemented in software for execution by a processor, or in hardware, in a manner that is known to those skilled in the art.

In accordance with this aspect of the present invention, a plurality of diverse network connections may be aggregated to create an aggregated network connection. The diversity of the network connections may be a result of diversity in provider networks due to the usage of different equipment vendors, network architectures/topologies, internal routing protocols, transmission media and even routing policies. These diversities may lead to different network connections with different latencies and/or jitter on the network connection. Also, variation within transmission paths in a single provider network may lead to latency and/or jitter variations within a network connection.

Latency and jitter typically affect all data communication across the network connection. Latency, as is known to those skilled in the art, is the round-trip time for a transmission occurring end-to-end on a network connection. Jitter, as is known to those skilled in the art, is the variance in latency on a network connection for the same data flow. High latency and jitter typically have a direct and significant impact on application performance and bandwidth. Applications such as VOIP, and video delivery are typically highly sensitive to jitter and latency increases and can degrade as they increase.

Transparent aggregation of a plurality of network connections in an aggregated network connection requires the management of data transmitted over the aggregated connection by the aggregation engine and received from the aggregation traffic termination engine. In one aspect of the present invention, transparent aggregation does not require any configuration by a network provider. The aggregation engine and the aggregation traffic termination engine may manage data transmission such that the variable path speeds and latencies on the plurality of network connections do not affect the application data transmitted over the aggregated network connection. The network aggregation engine and the aggregation traffic termination engine may handle sequencing and segmentation of the data transmitted through the aggregated connection to transparently deliver application data through the aggregated connection with minimal possible delay while ensuring the ordered delivery of application data.

In one aspect of the invention, the network aggregation engine provides a newly aggregated network connection with a capacity equal to the sum of the configured maximum throughput of the network connections.

The aggregation engine and an aggregation traffic termination engine (further explained below) handle the segmentation of packets as required in confirmation with architectural specifications such as Maximum Segment Size (MSS) and Maximum Transmission Unit of the underlying network connections. The network aggregation device is operable to handle assignment of sequence identifiers to packets transmitted through the aggregated network connection for the purpose of maintaining the ordering of transmitted data units over the aggregated network connection.

In a further aspect of the invention, the network connection device includes or is linked to a connection termination device, and a plurality of fixed or hot swappable transceivers for transmitting communication traffic on respective sets of network connections, for the purpose of configuring a plurality of network connections as an aggregated connection or the management of multiple aggregated network connections and providing access to the aggregated network connection for any network communications traversing the device.

In the present disclosure, routing protocols or route selection mechanisms described are intended only to provide an example but not to limit the scope of the invention in any manner.

Figure 2E:
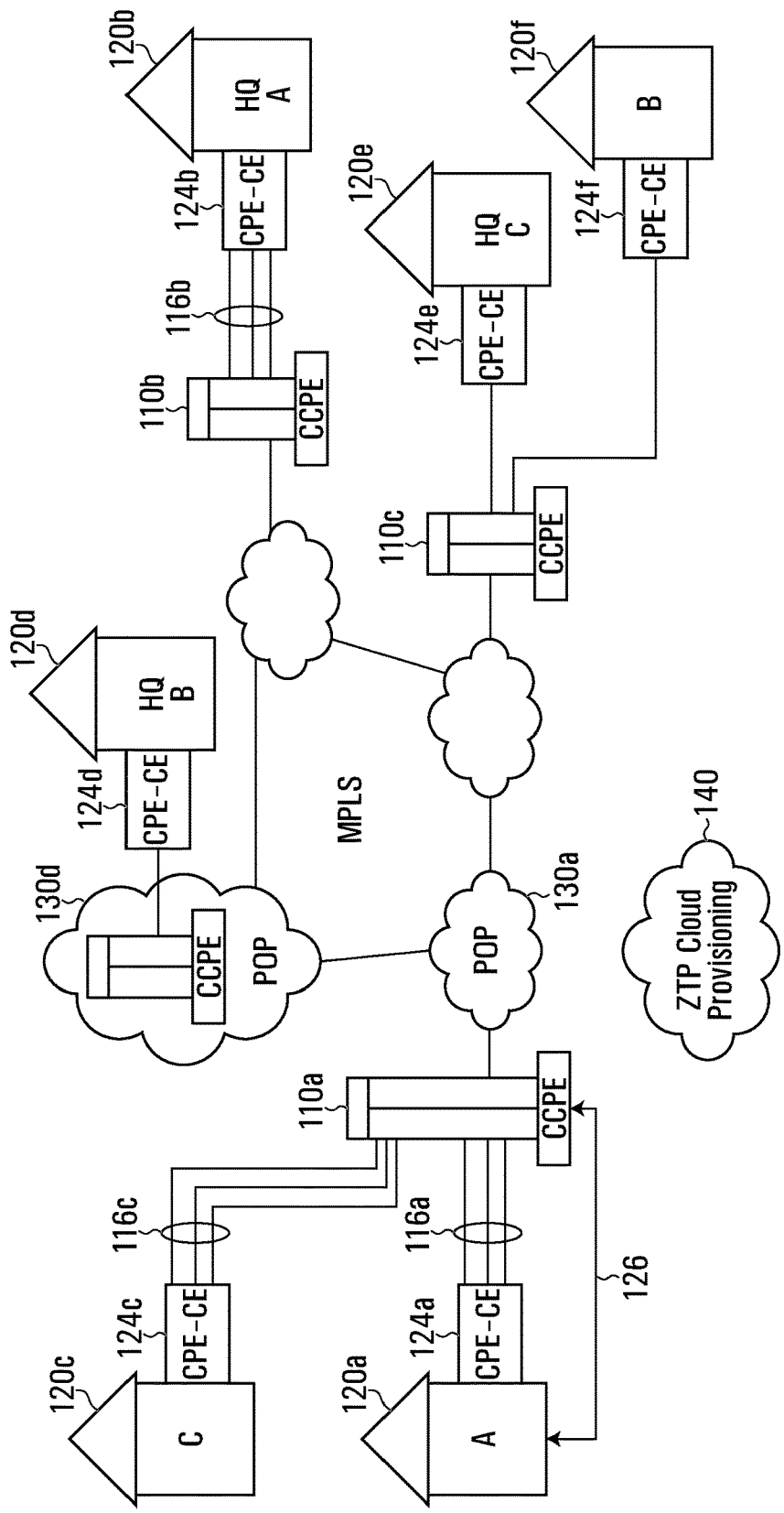
FIG. 2e shows a network solution with bonding/aggregation implemented at both Site A, Headquarter (HQ) A and Site C to connect to an MPLS network connecting to Headquarter (HQ) B, Headquarter (HQ) C, and Site B.

FIG. 2e shows an exemplary embodiment of a network solution with bonding/aggregation implemented at both Site A, Headquarter (HQ) A and Site C to connect to an MPLS network connecting to Headquarter (HQ) B, Headquarter (HQ) C, and Site B.

As shown in FIG. 2e, a number of customer sites (120a, 120b, 120c, 120d, 120e, and 120f) are connected to each other via an MPLS network 112, which may provide a secured VPN network solution to multiple users. The MPLS network backbone is typically provided by one carrier but multiple MPLS networks provided by multiple carriers may also be connected via multiple Points-of-Presence (POPs) to form a super network. As can be seen from the exemplary embodiment, each of Site A 120a and Site C 120c has a CPE-CE (124a and 124c, respectively), which is then connected to a CCPE 110a with some form of link aggregation/bonding technology as described elsewhere in this disclosure. The CCPE 110a can be also connected to other CCPEs (not shown) within a Point-of-Presence 130a located closest to Site A 120a and Site C 120c. As mentioned earlier in this disclosure, CCPE 110 also acts as a PE router to an MPLS network 112 in that it takes incoming or inbound traffic or packets, examines each packet and then encapsulates the packet with an appropriate MPLS label based on a variety of factors. As MPLS can be layer 2 independent, it can work with any layer 2 protocol including but not limited to ATM, frame relay, Ethernet MAC layer, or PPP. Depending on the content of the incoming (un-labeled) packet, COPE is operable to inspect/examine the destination IP address and other information in the packet header, insert a label into the packet and forward the labeled packet to the output port. Once the labeled packet exits CCPE 110 and enters the MPLS network core 112, another router commonly known as a Label Switch Router (LSR), receives the labeled packet. It examines the label and performs a table loop-up at the forwarding table to find the new label and the output port. The LSR then swaps the old label with the new label and routes the newly labeled packet to the next output port. Other LSRs within the MPLS network will perform the same tasks. Eventually the labeled packet will reach another provider edge router. The provider edge router can then examine the label and perform a table look-up at the forwarding table to find that the packet is to be sent to, for example, CCPE 110*c* connected to HQ C 120*e* and Site B 120*f*. It then removes the label and sends an unlabeled packet to CCPE 110*c*. COPE 110*c* will receive the unlabeled packet and examine the IP header information to determine the final destination e.g. HQ C 120*e*, Site B 120*f*, or another destination, such as, e.g., HQ A 120*b*.

In another exemplary embodiment of the invention, CCPE can also act as the provider edge router for data packets exiting (e.g. "outbound data packets") the MPLS network core 112. For example, labeled packets traveling through the MPLS network core 112 can be routed to and reach a CCPE on the edge of the MPLS network. The CCPE can then examine the label of the outbound data packet and perform a table look-up at the forwarding table to determine that the packet is to be sent to a CPE-CE ("destination CPE-CE") connected to the CCPE. The CCPE can further remove the label from the outbound data packet and send it to the destination CPE-CE over ANA link aggregation connections. In some instances the CCPE may determine that the destination CPE-CE may be associated or connected with another CCPE over a POP 130 or the MPLS network core 112, in which case the CCPE may re-encapsulate the data packet if necessary and send it back to the POP and/or MPLS network for further transmission to its final destination. As will be described below, each COPE may comprise a Network Aggregation Device 23 including a Network Aggregation Engine 11 and an MPLS Data Store 40.

In one aspect of the invention, encapsulation of data packets by a COPE 110 can be done as an on-stack protocol implementation by a network aggregation engine 11 (further described below) based on information supplied by an MPLS data store 40 within or connected to the CCPE 110. This way, network data can be transparently sent and received over link aggregation/bonding network 116 by CCPE and CPE-CE. Optionally, the CPE-CE can also implement full MPLS network data encapsulation capabilities.

It is shown that some CCPEs may not be associated with a POP, such as COPE 110*c* or 110*b*. Whether a COPE is part of a POP may change over time, as CCPE dynamically receives and analyzes real-time data regarding various network characteristics. For example, COPE 110*b* may receive information indicating that a commonly used network path has failed due to power outage, it then may decide to seek alternative connection to the MPLS core via the closest POP 130*d*. Cloud provisioning services 140 may also configure/reconfigure the CCPEs in real time based on a plurality of network characteristics.

It is further shown that some sites such as HQ B 120*d*, HQ C 120*e*, and Site B 120*f* do not have link aggregation/bonding technologies. That is, an MPLS network as described herein and its associated CCPEs may take both link aggregation/bonding connections or typical broadband connections without said link aggregation technology. Depending on what connection it is, a COPE may adjust accordingly and encapsulates the incoming packets with appropriate labels before forwarding the packets to the MPLS network core 112. A COPE may also de-label data packets before forwarding the packets to the final destination CPE-CEs for outbound data packets exiting the MPLS network core 112. For greater clarity, a COPE may act as a provider edge router and provide, in a simultaneous manner, encapsulation and de-labeling functionalities for inbound and outbound data packets respectively.

As an overarching cloud service, some form of cloud provisioning (or zero touch provisioning ZTP) 140 may also be provided to dynamically configure and reconfigure some or all of the CCPEs and all the CPE-CEs.

Benefits of the exemplary embodiments described in this disclosure include: i) the proprietary link aggregation/bonding technology described herein can utilize any kind of network connection, private or public, layer 2 or layer 3; and ii) the CPE-CEs and CCPEs can encapsulate the data packets for transparent interconnectivity across diverse carriers, with the lower-links aggregated. In other words, even though an MPLS network is typically sold as a private offering utilizing diverse physical local loops to the end customer using the same carrier, the invention described herein can encapsulate over any carrier using any local physical loop, some times without the need to participate at layer 1 network.

The architecture of embodiments of the present invention can be understood as a centralized architecture for aggregating network connections, broadband or otherwise. Diverse network connections are aggregated into a virtual (logical) connection that provides higher throughput as well as independence of the network characteristics of the constituent (physical) network. The virtual connection can then be connected to an MPLS network in manners as described herein. Aggregation may be performed to a given CPE-CE terminal.

For instance, in one example of the implementation of the present invention a Metro Ethernet 10 Mbps (E10) link and a T1 (DS1) link can be aggregated in accordance with the invention as described below, in order to provide higher fault tolerance and improved access speeds. The aggregation of diverse carriers in accordance with the present invention extends to any broadband network connection including Digital Subscriber Line (DSL) communications links, Data over Cable Service Interface Specification (DOCSIS), Integrated Services Digital Network, Multi protocol Label Switching, Asynchronous Transfer Mode (ATM), and Ethernet, etc.

The links to be aggregated can be any private or public Internet services such as cable, ADSL, T1, Fibre, xOE (over Ethernet types), wireless, as well as other MPLS connections so long as the network path reaches a CCPE for lower-link processing from a CPE-CE terminal.

Furthermore, the various network configurations shown in FIGS. 2*a* to 2*f* allow the use of low cost Internet links on the client side and where appropriate, between a first MPLS network and a second MPLS network, in order to provide connectivity on the client side and manage connectivity to the one or more MPLS network(s). In effect, this network architecture allows one or more MPLS networks to be brought to normal broadband users. Security is provided through the link aggregation/bonding technologies described elsewhere in this disclosure. The various network configurations can further allow various intelligent network performance features to be deployed.

Figure 2F:
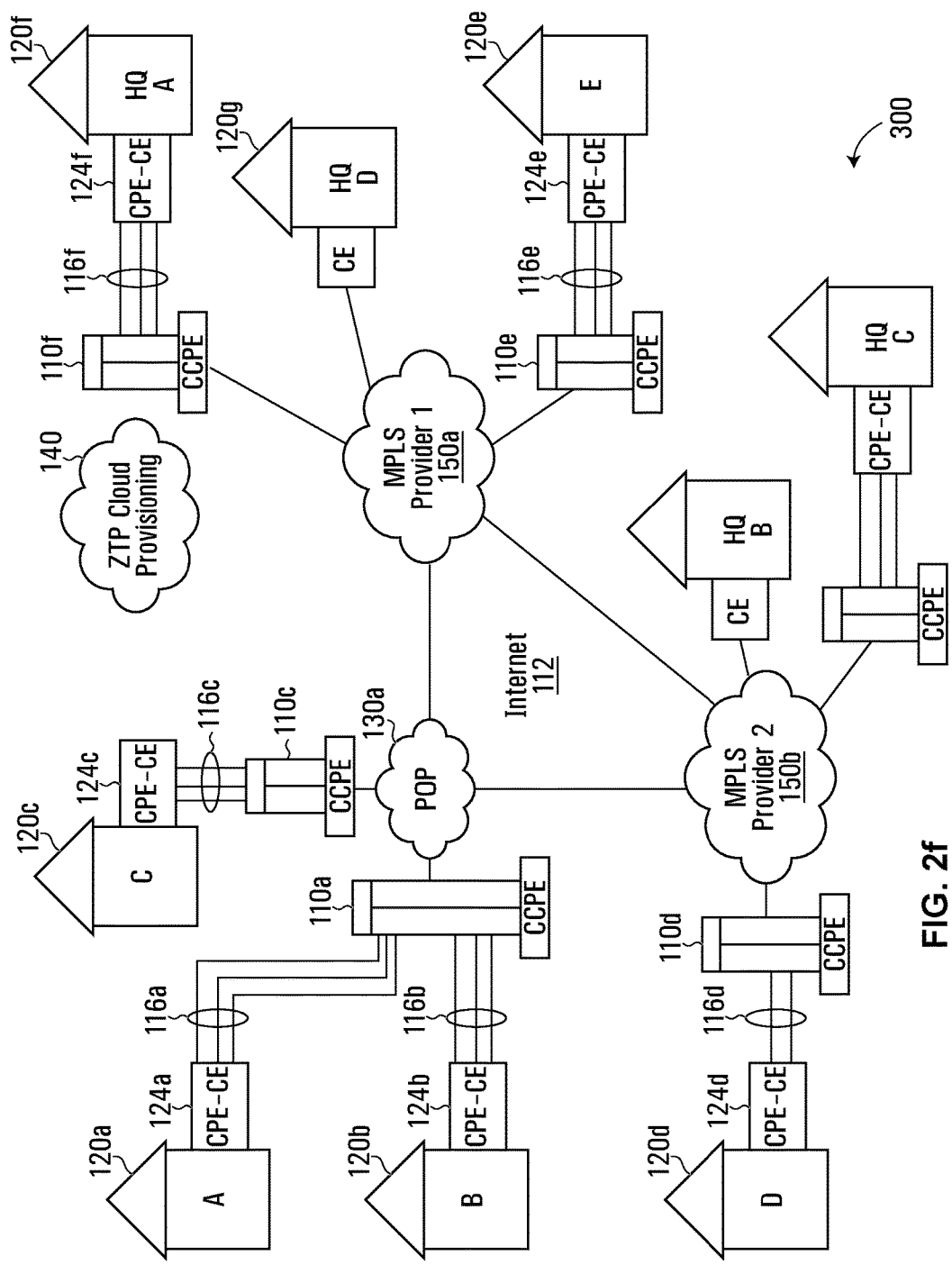
FIG. 2f shows a network solution with bonding/aggregation implemented at Site A, Site B, Site C, Site D, HQ A, HQ C and Site E to connect to a first MPLS network from a first provider connecting and a second MPLS network from a second provider.

Turning now to FIG. 2f, which shows a network solution with bonding/aggregation implemented at Site A, Site B, Site C, Site D, HQ A, HQ C and Site E to connect to a first MPLS network from a first provider connecting and a second MPLS network from a second provider.

As can be seen from FIG. 2f, with the unique advantages of multiple POPs, a plurality of MPLS networks from different MPLS providers can be connected to provide a secure, fast network between different end users. A first MPLS network 150a provided by a first MPLS provider is connected to HQ A 120f, HQ D 120g, and Site E 120e. HQ A 120f and Site E 120e each has link aggregation (116f and 116e) facilitated by CCPEs 124f and 124e, respectively. Similarly, a second MPLS network 150b provided by a second MPLS provider is connected to Site D, HQ B and HQ C. Each of the MPLS networks 150a and 160b can act as part of a POP in the overall network architecture 300. Even though only two MPLS networks are illustrated here, there can be a plurality of MPLS networks not limited to two or any particular total of networks. This way, one can extend an MPLS network to use other MPLS or non-MPLS connections to reach the end customer, whether using static or dynamic IP addressing, and without the participation of carriers.

Specifically, a CCPE 110a can be connected to more than one CPE-CE devices 124a, 124b and 124c, supporting a multi-tenant service for multiple customers. That is, a CCPE 110a can treat each CPE-CE 124a, 124b or 124c connected to the CCPE independently, with link aggregation 116a, 116b and 116c between each CPE-CE and CCPE.

In another example (not explicitly illustrated), a CCPE can facilitate many CPE-CE's to one CCPE implementation, supporting a multi-tenant service for multiple customers on their own MPLS network. This can be serviced by a single CCPE treating each CPE-CE independently on their own tenant instance or MPLS network.

Figure 3:
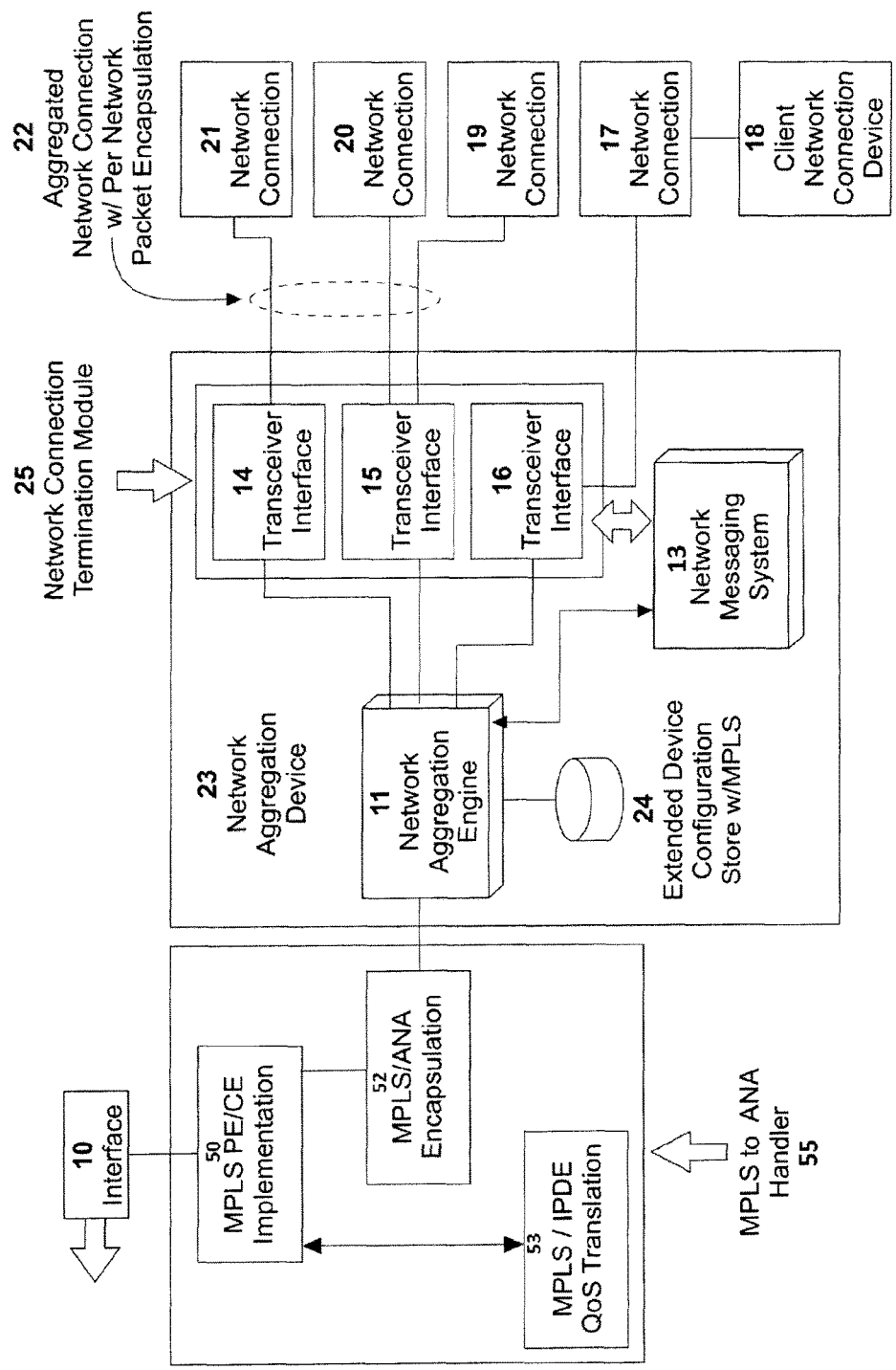
FIG. 3 is a block diagram of a communication device incorporating a particular embodiment of the invention, demonstrating the device as an aggregation means on the client/CPE-CE side of a network connection.

FIG. 3 is a block diagram of a communication device incorporating a particular embodiment of the invention, demonstrating the device acting as a client or CPE-CE.

As shown in FIG. 3, the network element/network aggregation device (also referred to in this disclosure simply as the "device" or the "network aggregation device") 23 includes (in this particular embodiment shown for illustration) a network connection termination module 25 that includes representative transceiver interfaces 14, 15 and 16. Each transceiver interface 14, 15 and 16 represents an interface to a physical communication medium through which communications may be established to network connections.

A possible implementation of the network aggregation device may use a single or multiple chassis with slots for multiple network connection termination modules and multiple network aggregation engine modules. The multiple network connection termination modules may be grouped by protocol specific or medium specific transceiver/interfaces.

The network aggregation engine 11 may handle the configuration of the network aggregation device and all related interactions with external inputs. An extended device configuration store with MPLS capacity 24 may provide persistent data storage for device configuration information such as a network aggregation policy and MPLS related configuration information and policies. MPLS related configuration information may include label lookup table, forwarding table, routing table, labeling and mapping policies, and/or MPLS provider information.

The network aggregation engine 11 may handle queries from external sources, such as configuration parameters a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In one exemplary embodiment of the invention, the described system can transport MPLS packets back and forth between MPLS core network and ANA link aggregation connection(s) so as to enable extending communication of MPLS packets beyond the edge of the MPLS core network, using ANA link aggregation technology. The system can include specific mechanisms for enabling the transport of the MPLS packets (e.g., data packets leaving MPLS core network and entering ANA) using transcoding/translating and then encapsulation for ANA link aggregation connection(s), in a way that maintains the integrity of the MPLS packet, including processing instructions such as those related to QoS. In the reverse transport flow, MPLS packets (e.g. data packets leaving ANA and entering MPLS core network) can be de-encapsulated to remove ANA protocol and where appropriate, transcoding/translation in order to obtain the original data packet without affecting integrity, and in such a way that can enable further, if any, MPLS processing to happen automatically.

For example, encapsulation, as will be described further herein, can be handled either by MPLS-to-ANA Handler 55. The MPLS-to-ANA Handler 55 can be implemented either as the ANA client, the ANA server and/or the ANA protocol itself.

In accordance with an aspect of the present invention, multiple network connections may be combined to form an aggregated network connection 22, as disclosed in further detail herein. Each individual network connection may be configured with a maximum communication traffic rate, which could be expressed as a bit rate in bits per second.

The network aggregation engine 11 may be implemented in software for execution by a processor in the network aggregation device 23, or in hardware such as by means of a Field Programmable Gate Array (FPGA) or other integrated circuit, or some combination thereof. The network aggregation engine 11 may be implemented in a distributed manner by distributing aggregation engine intelligence to the network connection termination module 25, in a manner that is known.

The network aggregation engine 11 may receive traffic from client network connection device 18 through a network connection 17 provided through a transceiver interface 16. The client network connection device 18 may be any device including, without limitation, a router, switch, or media converter that is capable of providing termination for a single or multiple client nodes, where nodes are any devices capable of connecting to a network irrespective of protocol or interface specificity. In various embodiments, traffic may be received over multiple network connections through a single or multiple transceiver interfaces. The network aggregation engine 11 may accept all traffic from the client network connection, may provide encapsulation and segmentation services for the traffic for transmission through the aggregated network connection 22, and may transmit it over any of the network connections 19, 20 and 21 through any of the transceiver interfaces 14, 15 and 16. The network aggregation engine 11 may handle segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

In the embodiment of the invention, as shown in FIG. 3, the network aggregation engine 11 may be connected to an MPLS to ANA Handler 55. The engine 55 may comprise an MPLS PE/CE implementation module 50, an MPLS/ANA encapsulation module 52 and an MPLS to IPDE QoS Translation module 53. During operation of transmitting data packets from client site CPE-CE to MPLS core, network aggregation engine 11 may send the packet to the MPLS to ANA Handler 55. The data packet may be encapsulated via MPLS/ANA Encapsulation 52 based on specific MPLS configuration data in the extended device configuration store 24. The encapsulated data packet can then be sent to MPLS PE/CE implementation module 50, which may further provide segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

In addition, MPLS to link aggregation (or ANA) transcoding can be performed between the MPLS core and the Customer LAN via the MPLS to ANA Handler 55. In a direction from MPLS core to the edge, as an example, the CCPE MPLS protocol implementation can communicate with the MPLS core recognizing packets that are destined for the customer LAN located over the link aggregation session serviced by the a CCPE implementation. At this point, the data packets with MPLS protocol can be transcoded and transmitted over the link aggregation session to the customer's CPE-CE device with labels intact. When the packets reach the ANA CPE-CE device, the CPE-CE device can transcode from link aggregation ANA to MPLS again and deliver the packets on to the customer LAN.

In one embodiment, the virtual (logical) link aggregated from a variety of diverse or dissimilar network connections through a single or multiple transceiver interfaces may be implemented over one physical link to encompass a single link aggregation for MPLS Edge with a bi-directional IP Quality of Service (QoS) achieved.

In one exemplary embodiment of the invention, a data packet with MPLS protocol may be transmitted across the MPLS core and arrive at the CPE-CE side of a network connection with MPLS label(s). The MPLS labels can be retrieved and/or parsed by the CPE-CE device 124 (e.g. by an MPLS to ANA Handler 55) in order to determine further processing of the packet. In the system described herein, (1) the MPLS labels can be acquired from the data packet with MPLS protocol (or also known as "MPLS packet"); (2) a table (such as a distribution table) maintained within or connected to the CPE-CE device 124 can cause the destination associated with the data packet and/or the MPLS label to be determined and accessed, and to retrieve corresponding rules (from e.g. Extended Device Configuration Store 24) to determine how to distribute the data packet over aggregated network connections; (3) if corresponding MPLS processing rules are found these are used for distribution of the data packet over aggregated network connection(s); and if (4) no corresponding MPLS processing rules are found the data packet is not handled. In the case of (4) the system may default to IP processing rules.

The MPLS packet can include a header, that can be used for sub-processing. The sub-processing can include IPDE to QoS transcoding or translation by MPLS/IPDE QoS Translation module 53. This involves transcoding or translating the QoS request associated with a packet, as opposed to the packet itself. This now enables the link aggregation ANA system to handle the MPLS packet based on the associated QoS requests, and also ensure that those QoS requests remain intact for handling by MPLS PE/CE at the destination. The packet's integrity is maintained, including its MPLS label.

Once transcoding/translation is done, ANA encapsulation may occur. An encapsulation technique is used can be MPLS network compatible or MPLS aware. This can be accomplished by using MPLS protocol as part of ANA encapsulation by MPLS/ANA Encapsulation module 52.

Extended Device Configuration Store 24 can allow ANA system to process MPLS packets. It may contain some of the same information that is used to perform the MPLS to IPDE QoS translation.

The system can continue to apply the QoS requests and therefore handling of MPLS packets continues to happen within ANA in a way that is consistent with transport of MPLS packets on an MPLS network. The packets are not necessarily modified, rather, handling of the MPLS packet can occur based in part on ANA rules, that are made to adhere dynamically to MPLS handling rules.

In another embodiment, a similar process may operate in a reverse direction: MPLS packets may come out of ANA link aggregation connection first by de-encapsulating, and then translating/transcoding so as to provide the MPLS data packets.

In one embodiment, the network aggregation engine 11 may poll the state of network connections 19, 20 and 21, for example, as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 4:
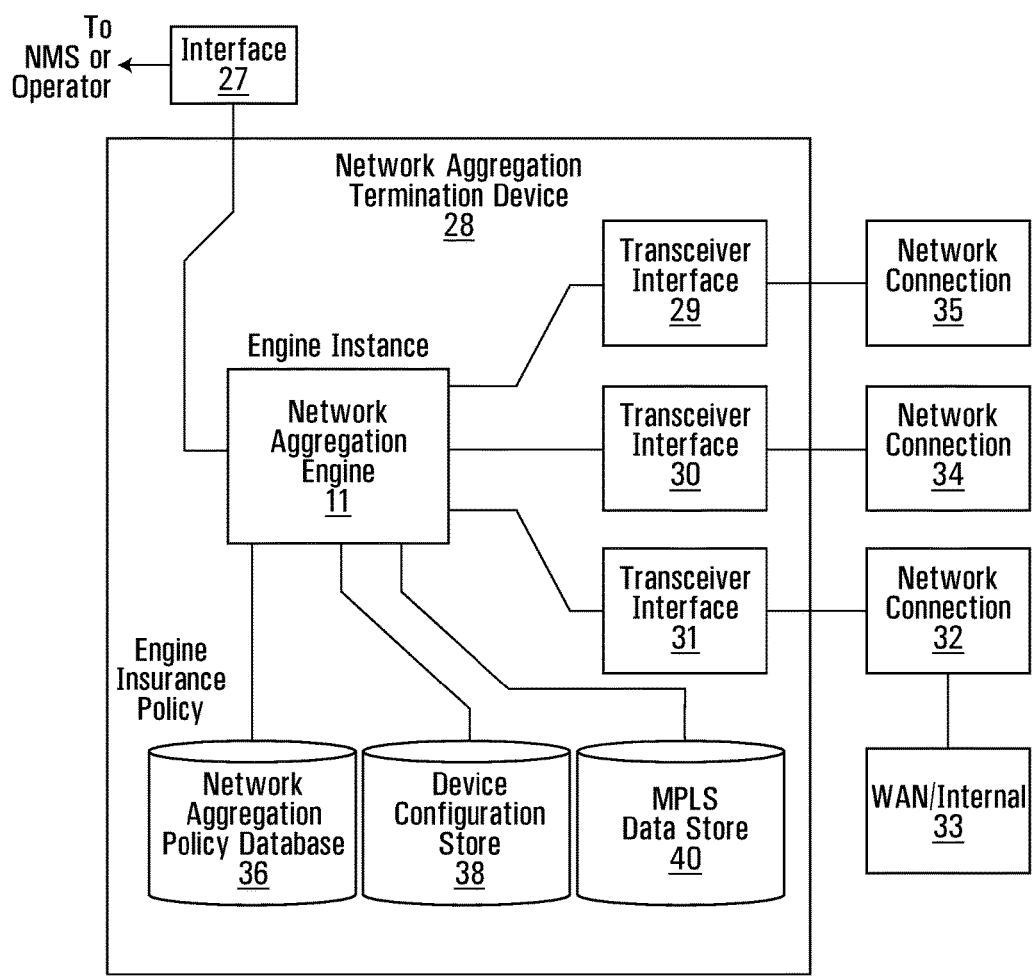
FIG. 4 is a block diagram of a communication device incorporating a particular embodiment of the invention, demonstrating the device as an aggregation means on the server/concentrator side of a network connection and an MPLS data store.

FIG. 4 is a block diagram of a communication device incorporating a particular embodiment of the invention, demonstrating the device acting as a server/concentrator or CCPE.

The network aggregation engine 11 may provide access to a network aggregation policy database 36 which stores configuration information related to the various aggregated network connections that terminate on the aggregated network connection device 28. The network aggregation termination device 28 may be implemented in such a manner that each aggregated network connection defined in the network aggregation policy database 36 is handled by its own virtual instance, the use of which enables termination of each aggregated network connection from multiple customer premises equipment (CPE-CE). In addition, an MPLS data store 40 may provide persistent data storage for MPLS related configuration information such as label lookup table, forwarding table, routing table, labeling and mapping policies, and/or MPLS provider information. As described above, based on the information in MPLS data store 40, Network Aggregation Engine 11 may be operable to encapsulate incoming or inbound data from CPE-CE for transmission into core MPLS network. In a similar fashion, Network Aggregation Engine 11 may remove MPLS label from outbound data packets exiting an MPLS network and forward the data packets to the appropriate CPE-CE based on a label look-up table or a forwarding table. In cases where multiple CPE-CE devices are handled by one CCPE, Network Aggregation Engine 11 is further operable to determine, based on the MPLS data store 40 and/or the MPLS label information on the outbound data packets, the final destination CPE-CE(s) to which each outbound data packet should be delivered.

Figure 5:
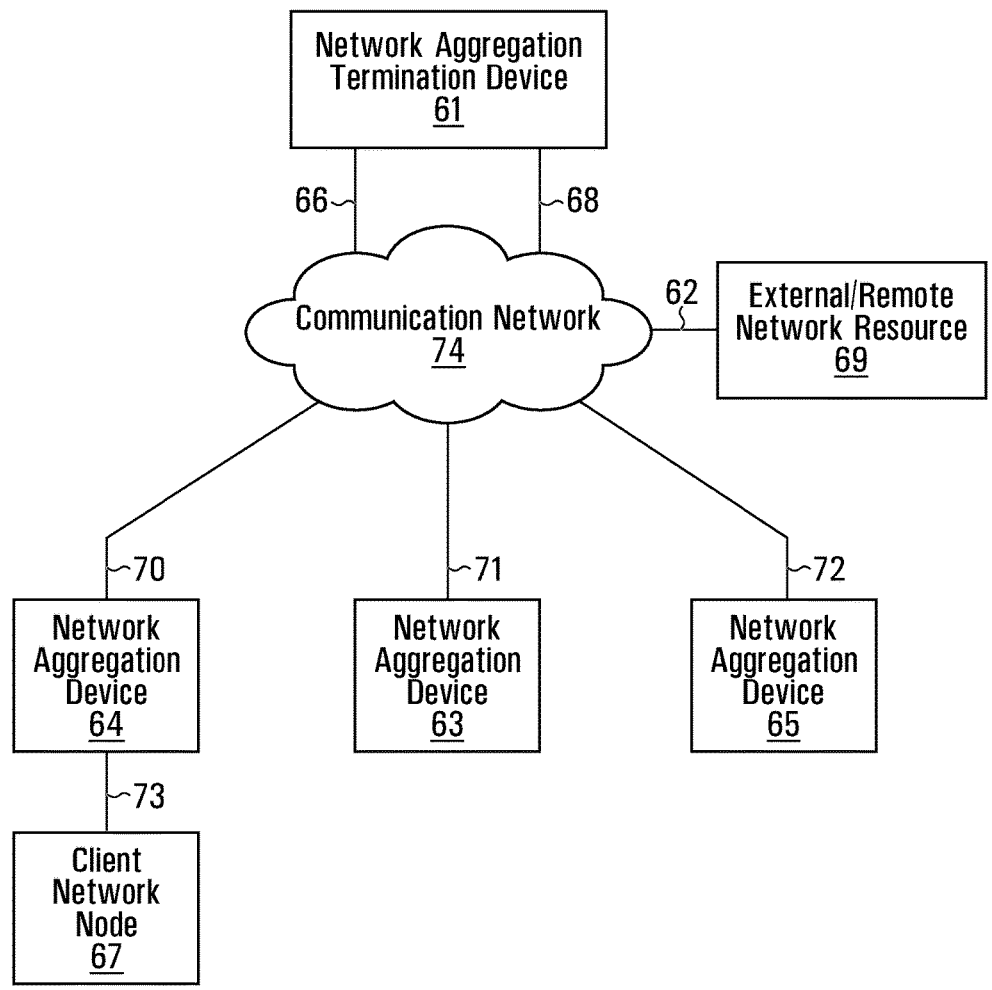
FIG. 5 is a block diagram of a communication network incorporating a particular embodiment of the invention, demonstrating the device as an aggregation means on both the client/CPE-CE side and server/concentrator or CCPE side of a network connection.

FIG. 5 is a block diagram of a communication network incorporating a particular embodiment of the invention, demonstrating the function of the device acting as a client/CPE-CE and server/concentrator or CCPE.

In accordance with a particular embodiment of the invention, aggregated network connections 70, 71 and 72 may be built by network aggregation devices 63, 64 and 65, which terminate to a single aggregated network connection termination device 61 through network connections 66 and 68 as their endpoint. The aggregated network connection termination device 61 may access external communications networks through network connections 66 and 68 to access external/remote network resource 69. Access to external communications networks, such as an MPLS network or the Internet, may be provided by the aggregated network connection termination device 61 by using either network connection 66 or 68 through the use of a routing protocol, such as Border Gateway Protocol (BGP), Open Shortest Path (OSPF), or through the use of simpler mechanisms such as load sharing over multiple static routes within the communication network 74 that acts as the valid next-hop for the aggregated network connection termination device 61.

Aggregated network connections 70, 71 and 72 may provide access to client network nodes 67 connected to the network aggregation devices 63, 64 and 65 through the aggregated network connections 70, 71 and 72 to communications networks 74 accessible by the aggregated network connection termination device 61.

A client network node 67 may request data provided by an external/remote network resource 69 accessible through a communication network 74. This request for the external/remote network resource may be routed over the network connection 73 providing access from the client network node 67 over the aggregated network connection 70 to its end-point which is the aggregated network connection termination device 61. This may be done through the communication network 74 through the network connection 66 into the aggregated network connection termination device 61. Any data sent by the external/remote network resource 69 may be routed back through the aggregated network connection termination device.

A particular embodiment of this invention may use the Internet as the communication network 74 referenced in FIG. 5. However, the communication network 74 may alternatively be built by multiple sub-networks created through the use of multiple network aggregation devices 63, 64 and 65 with aggregated network connection termination device 61 end points through multiple network connections 66 and 68. Furthermore, the communication network 74 may also be an MPLS network provided by an MPLS provider or carrier.

Figure 6:
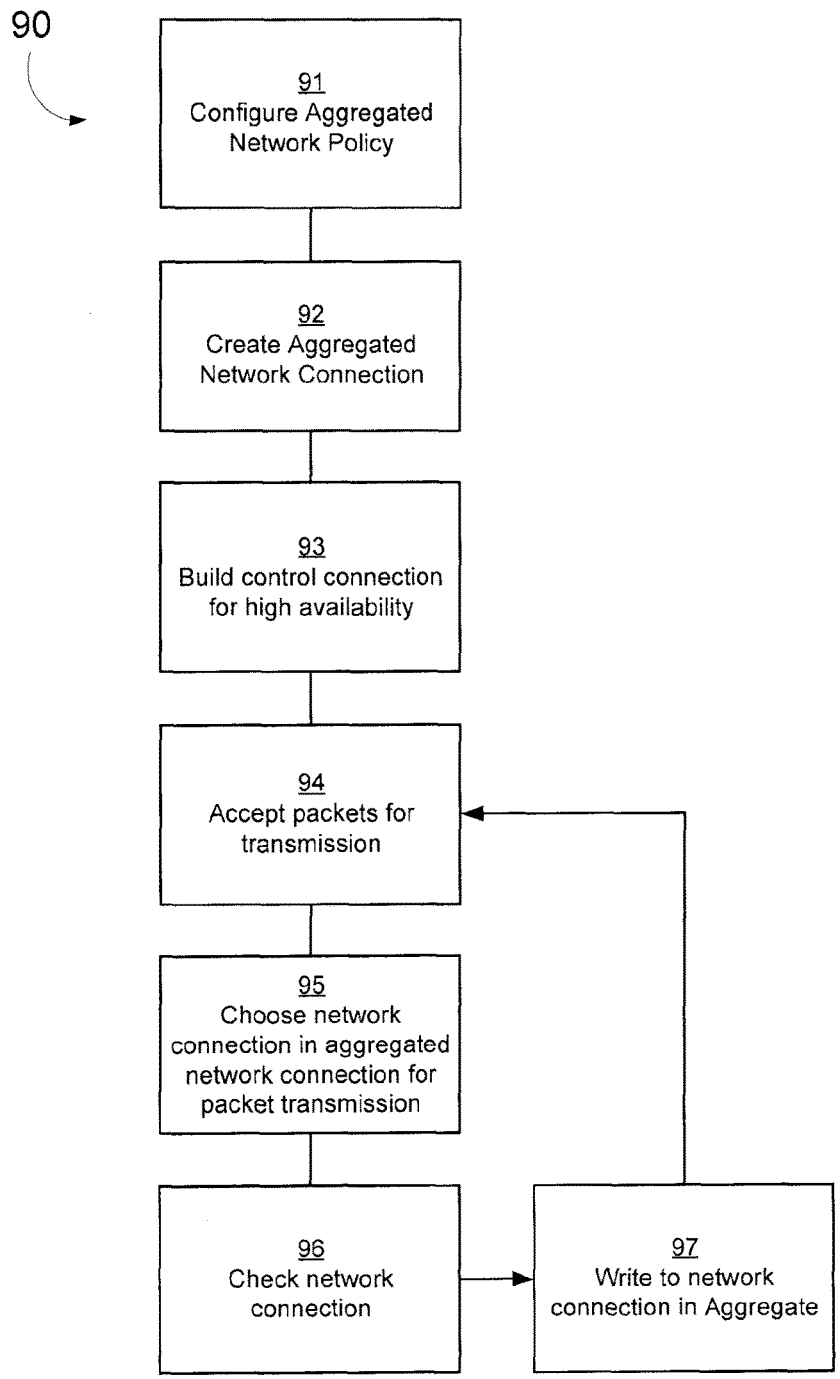
FIG. 6 is a flow diagram of a method of providing redundancy and increased throughput through a plurality of network connections in an aggregated network connection.

A further aspect of the invention relates to the provisioning of high availability over the aggregated network connection by the network aggregation engine 11. FIG. 6 illustrates a method of providing redundancy and increased throughput through a plurality of network connections in an aggregated network connection. The method 90 may begin with a step of configuring a plurality of network connections 91 through the creation of a network aggregation policy to form 92 the aggregated network connection. The aggregated network connection may be initialized as per the network aggregation policy. Control connections may be created 93 for the plurality of network connections configured as part of the aggregated connection to allow the aggregation engine 11 to manage the membership of a network connection within the aggregated connection. The network aggregation engine 11 may accept packets for transmission 94 over the aggregated network connection 22. The network aggregation engine 11 may choose a network connection 95 among the group of network connections configured 91 in the aggregate in the stored aggregation policy for transmission of the current packet being transmitted. The choice of network connection for transmission of the current packet may be specified within the aggregation policy and may take into account data provided by the control connection built at 94.

According to one embodiment of the invention, a non-responsive network connection may be easily detected when using latency and packet loss as a measure. The mechanism for detecting 96 and adapting to 97 the network connection change within an aggregated network connection may be implemented within the data transmission routine in the aggregation engine 11 or as a separate process in parallel to the transmission routine in the aggregation engine 11 to allow for further flexibility in provisioning redundancy within the aggregated network connection.

Since this may occur on a per packet basis as opposed to on a per stream basis, a single non-responsive network connection may not affect the aggregated network connection and may allow data transmission to continue regardless of the individual states of network connections so long as a single network connection within the aggregated network connection is available for data transmission.

Encryption

Encryption may be provided for the link aggregation connections between a CPE-CE and a COPE. In one exemplary embodiment of the invention, each lower link connection handled and aggregated by a CCPE or CPE-CE may be encrypted by the Network Aggregation Engine 11.

In an embodiment of the invention, an overlay of IPSEC may be implemented over the link aggregation connections, sometimes in conjunction with existing IPSEC Edge implementations. For example, IPSEC gateways or clients can be installed on the CPE-CE's connected to the various CCPEs. In turn, the CPE-CEs with the IPSEC clients can terminate the IPSEC sessions on the COPE or an existing carrier's IPSEC gateway on the MPLS network. Alternatively, IPSEC may be implemented at the PE routers or device such as a COPE.

Example In Operation

Figure 7A:
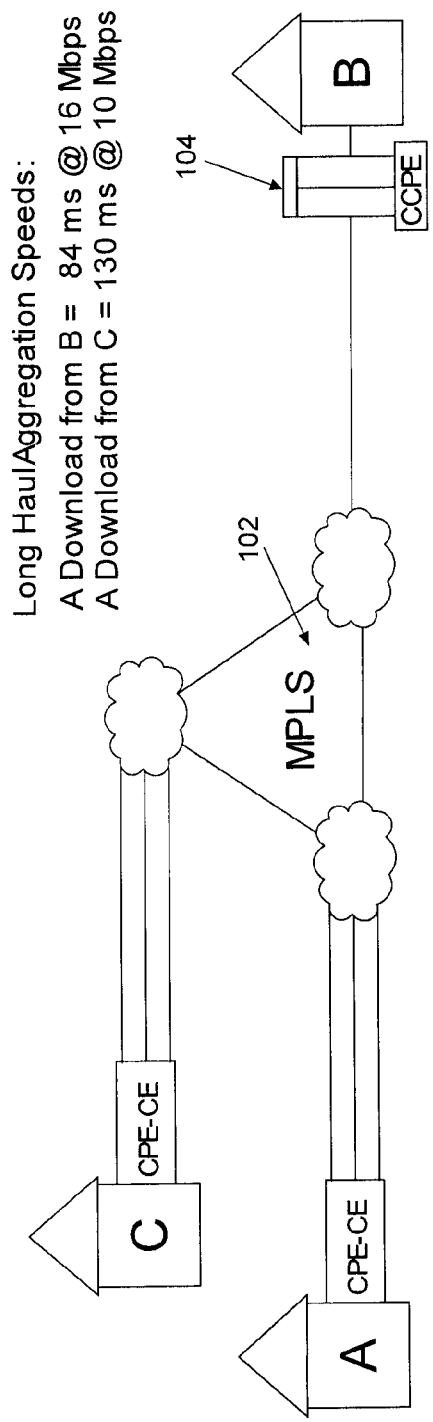
FIG. 7a illustrates a prior art network architecture where long haul effects apply, and presents network performance based on download speed.
Figure 7B:
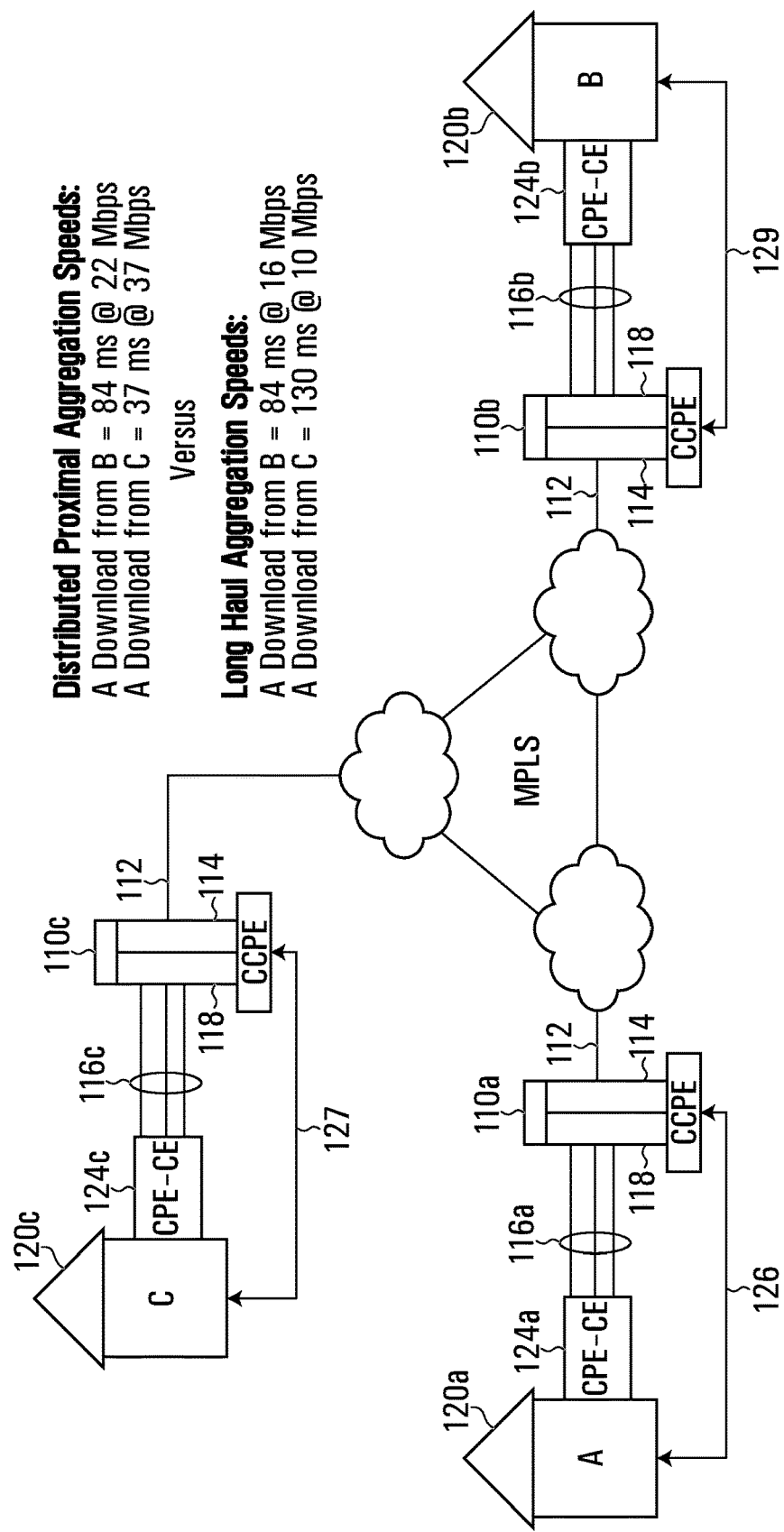
FIG. 7b illustrates, in similar network conditions as in FIG. 7a but implementing the present invention in order to reduce long haul bonding/aggregation, improved network performance based on faster download speed.

In one possible implementation of the present invention, 3 locations are provided namely Site A, Site B, and Site C, and Site D. FIGS. 7a and 7b illustrate network performance as discussed herein. FIG. 7a illustrates performance with long haul effects. FIG. 7b illustrates performance with reduction of long haul effects, based on the present invention in network conditions otherwise similar to those on which FIG. 7a is based.

FIG. 7b shows an improvement in performance over FIG. 7a, based on reduction of long haul effects in relatively long distance network communications are implemented using the network architecture.

Embodiments of the present invention therefore may provide improved network performance relative to speed. A skilled reader will appreciate that the improvement in performance shown for the above example is significant. Other aspects of network performance, e.g., latency may also be improved.

Advantages and Use Case

The present invention significantly improves network performance between disparate locations by leveraging network bonding/aggregation technology, but by implementing a system, method and network configuration that provides intervening network components disposed adjacent to access points so as to manage traffic between two or more sites such that bonded/aggregated connections are terminated and traffic is directed to a network backbone, and optionally passed to one or more further bonded/aggregated connections associated with a remote additional site.

The network solutions of the present invention is flexible, responsive, scalable and easy to implement. New sites, optionally having their own CPE-CE and/or CCPE can be easily added, and the network solution supports various types of multi-point network communications, and various network performance improvement strategies including various QoS techniques.

The network solution is easily updated with new programming or logic that is automatically distributed on a peer to peer basis based on the interoperation of network components that is inherent to their design, as previously described.

As explained earlier, embodiments of the present invention may offer advantages over the prior art technologies, including, for example:

1. Carrier diversity
2. Failover protection
3. Aggregated bandwidth
4. Bi-directional communication
5. Network quality of service (QoS)
6. No dropped calls
7. Application acceleration
8. Quality of Experience scoring In addition, combining MPLS network with the link aggregation/bonding technology described in the exemplary embodiments is an approach to satisfying end customer needs on an MPLS network, namely:

Use of multiple low cost broadband circuits (for greater uptime and resiliency)
Support of prioritization and CoS for priority traffic
Hybrid MPLS or backup network strategy without having to abandon MPLS features Furthermore, additional advantages provided by embodiments of the present invention may include:

It paves a way for each carrier or network provider to offer an innovative MPLS network over broadband solution that is differentiated from their competitor's offering.
Customers would be able to select the given carrier or provider for Hybrid and/or Backup MPLS solutions via a customized network configuration.
Cloud provisioning, or "Zero Touch Provisioning" can configure/reconfigure all the network elements dynamically.
An ability to aggregate/terminate multiple MPLS providers in a single location.
Interoperability between networks can be handled by the cloud provisioning element.
Network providers or partners can deliver an "any/any/any" experience to their customers—BYOMPLS (Bring Your Own MPLS) ability to the network providers or partners.
Customers would be able to select carriers offering MPLS with link aggregation/bonding over broadband to obtain QoS, Resiliency, and application acceleration not achievable with current offerings on the market.
And many others.

Network performance is significantly improved over prior art solutions as illustrated in the Example In Operation provided above.

The invention claimed is:

1. A network system for improving network communication performance between at least a first client site and a second client site, wherein the first client site and the second client site are at a distance from one another that would usually require long haul network communication, the system comprising:

at least one network computer system that includes:
a network server component, configured to connect with a client site network component associated with the first client site through a network connection, the network server component including a server/concentrator or a cloud concentrator element that is implemented at an access point to a multiple protocol label switching network;
wherein the client site network component and the network server component are configured to interoperate to provide network communications between the first client site and the access point, wherein between the client site network component and the network server component data traffic is carried over the network connection, and between the access point and the second client site, the network server component automatically terminates the network connection and passes the data traffic to the multiple protocol label switching (MPLS) network, while maintaining management of data traffic to provide a managed network path that incorporates at least the network connection and at least one network path carried over the multiple protocol label switching network;
wherein a plurality of network server components are implemented in a geographic area to provide a Point-of-Presence (PoP) proximate to the client site network components, and two or more Points-of-Presences are accessible to the client site network component; and wherein the client site network component is configured to: collect network performance information; and initiate the configuration of the network overlay to include one or more network server components to improve network communication performance.

2. The network system of claim 1, wherein the managed network path is maintained between the first client site and the second client site without routing of network communications through a central server that increases long haul effects.

3. The network system of claim 1, wherein one or more client site network components and one or more associated network server components include peer-to-peer programming and based on such peer-to-peer programming operate on a peer to peer basis.

4. The network system of claim 1, wherein the network server component is disposed at a distance from an access point that does not result in long haul effects between the network server component and the access point.

5. The network system of claim 1, wherein the network server component is accessible to a plurality of client site network components, each client site network component being associated with a client site.

6. The network system of claim 1, comprising a network of Points-of-Presence, distributed geographically to serve a plurality of client locations, each associated with at least one of the one or more client site network components.

7. The network system of claim 1, comprising:
 (a) the client site network component at each of the first client site, and a second client site network component at the second client site;
 (b) the network server component, wherein the network server component is proximal to the first client site, and a second network server component proximal to the second client site;
  wherein:
   communications between the first client site's client site network component and associated network server component are bonded or aggregated, then terminated by the network server component associated with the first client site's client site network component, and passed to the multiple protocol label switching network; and
   data traffic is received by the network server component associated with the second client site and transferred on a bonded or aggregated connection between the second network server component associated with the second client site and the second client site network component associated with the second client site.

8. The network system of claim 1, wherein the computer system includes a network aggregation device that: (A) configures a plurality of dissimilar network connections or network connections provided by a plurality of diverse network carriers ("diverse network connections") as one or more aggregated groups, each aggregated group creating an aggregated network connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances to configure and maintain the aggregated network connection so that the logical connection has a total communication traffic throughput that is a sum of available communication traffic throughputs of the aggregated group of diverse network connections.

9. The network system of claim 1, wherein the network server component is further configured to prepare data traffic for transmission into the MPLS network.

10. The network system of claim 9, wherein the preparing of data traffic comprises encapsulating data traffic with a MPLS label.

11. The network system of claim 1, wherein the network server component is further configured to prepare data traffic for transmission to the client site network component.

12. The network system of claim 11, wherein the preparing of data traffic comprises removing a MPLS label.

13. A computer implemented method for improving network communication performance between at least two sites, where the two sites are at a distance from one another that would usually require long haul network communication, comprising:
 (a) using a client site network component associated with a first client site to connect to a network server component, the network server component being connected to an access point to a MPLS network, forming thereby a network overlay that provides a network connection for carrying data packets;
 (b) the network server component terminating the network connection;
 (c) the network server component transferring the data packets to the MPLS network, for delivery to a second client site, while maintaining management of data traffic to provide a managed network path that incorporates at least the network connection and at least one network path carried over the MPLS network, thereby reducing long haul effects;
  wherein a plurality of network server components are implemented in a geographic area to provide a Point-of-Presence (PoP) proximate to the client site network components, and two or more Points-of-Presences are accessible to the client site network component; and
 (d) using the client site network component to: collect network performance information; and initiate the configuration of the network overlay to include one or more network server components to improve network communication performance.

14. The method of claim 13, comprising receiving the data traffic at the second client site.

15. The method of claim 14, comprising maintaining management of data traffic to provide a managed network path that includes the network connection and one or more network paths of the MPLS network.

16. The method of claim 13, comprising receiving the data traffic at a second network server component associated with the second client site, the second network server component initiating a bonded or aggregated connection to a client site network component associated with the second client site.

17. A computer implemented method for improving network communication performance between at least two sites, where the two sites are at a distance from one another that would usually require long haul network communication, comprising:
 (a) using a client site network component associated with a first client site to connect to a network server component, the network server component being connected to an access point to a MPLS network, forming thereby a network overlay that provides a network connection for carrying data packets;

(b) the network server component terminating the network connection; and the network server component transferring the data packets to the MPLS network, for delivery to a second client site, while maintaining management of data traffic to provide a manacled network path that incorporates at least the network connection and at least one network path carried over the MPLS network, thereby reducing long haul effects; wherein the at least one network computer system comprises the client site network component at the first client site, the client site network component bonding or aggregating one or more diverse network connections to configure a bonded/aggregated connection that has increased throughput.

18. The method of claim 17, comprising receiving the data traffic at the second client site.

19. The method of claim 18, comprising maintaining management of data traffic to provide a managed network path that includes the network connection and one or more network paths of the MPLS network.

20. The method of claim 17, comprising receiving the data traffic at a second network server component associated with the second client site, the second network server component initiating a bonded or aggregated connection to a client site network component associated with the second client site.

* * * * *